United States Patent
Bartlett

(10) Patent No.: US 12,222,450 B2
(45) Date of Patent: Feb. 11, 2025

(54) LIDAR SCANNING WITH EXPANDED SCAN ANGLE

(71) Applicant: Texas Instruments Incorporated, Dallas, TX (US)

(72) Inventor: Terry A. Bartlett, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 659 days.

(21) Appl. No.: 17/555,759

(22) Filed: Dec. 20, 2021

(65) Prior Publication Data

US 2022/0113386 A1  Apr. 14, 2022

Related U.S. Application Data

(62) Division of application No. 15/591,974, filed on May 10, 2017, now Pat. No. 11,237,251.

(60) Provisional application No. 62/334,810, filed on May 11, 2016.

(51) Int. Cl.
| | |
|---|---|
| *G06K 9/00* | (2022.01) |
| *G01S 7/481* | (2006.01) |
| *G01S 17/42* | (2006.01) |

(52) U.S. Cl.
CPC .......... *G01S 7/4817* (2013.01); *G01S 7/4814* (2013.01); *G01S 17/42* (2013.01)

(58) Field of Classification Search
CPC ...... G01S 7/4817; G01S 7/4814; G01S 17/42; G01S 17/931
See application file for complete search history.

(56) References Cited

U.S. PATENT DOCUMENTS

| | | | |
|---|---|---|---|
| 4,916,536 A | 4/1990 | Kerr et al. | |
| 6,011,874 A | 1/2000 | Gluckstad | |
| 7,734,086 B2 * | 6/2010 | Lee .................. | G03H 1/268 |
| | | | 382/274 |
| 9,219,905 B1 | 12/2015 | Georges, III | |
| 9,581,966 B1 | 2/2017 | Georges, III | |
| 9,618,369 B2 * | 4/2017 | Weaver ............. | G01D 11/00 |
| 9,791,569 B2 | 10/2017 | Hughes et al. | |
| 10,194,100 B2 | 1/2019 | Zhou et al. | |
| 10,281,262 B2 | 5/2019 | Takashima | |

(Continued)

OTHER PUBLICATIONS

Blanche, et al., "Digital Micromirror Device as a Differactive Reconfigurable Optical Switch for Telecommunication" Journal of Micro/Nanolithography, MEMS, and MOEMS, SPIEDigitalLibrary.org/jm3, vol. 13(1), 011104, Jan-Mar. 2014. 6 pages.

(Continued)

*Primary Examiner* — Shervin K Nakhjavan
(74) *Attorney, Agent, or Firm* — Michelle F. Murray; Frank D. Cimino

(57) ABSTRACT

In described examples of a system for outputting a patterned light beam, the system includes: an illumination source; a positive optical element positioned to receive light from the illumination source and to output converging light; a reflective element positioned to receive the converging light from the positive optical element, the reflective element configured to reflect the converging light to form a scan beam; and a negative optical element to receive the scan beam from the reflective element, the negative optical element configured to output the scan beam to a field of view.

20 Claims, 16 Drawing Sheets

(56) References Cited

U.S. PATENT DOCUMENTS

| | | | |
|---|---|---|---|
| 10,527,726 B2* | 1/2020 | Bartlett | G01S 7/4814 |
| 10,775,508 B1 | 9/2020 | Rezk et al. | |
| 11,237,251 B2* | 2/2022 | Bartlett | G01S 17/42 |
| 2005/0057741 A1 | 3/2005 | Anderson et al. | |
| 2010/0039686 A1* | 2/2010 | Nishiwaki | G11B 7/1369 |
| | | | 359/9 |
| 2011/0049344 A1* | 3/2011 | Dobashi | H01J 37/26 |
| | | | 250/252.1 |
| 2011/0261193 A1 | 10/2011 | Agurok et al. | |
| 2012/0050750 A1 | 3/2012 | Hays et al. | |
| 2012/0069342 A1 | 3/2012 | Dalgleish et al. | |
| 2012/0097834 A1 | 4/2012 | Lin et al. | |
| 2013/0307939 A1 | 11/2013 | May et al. | |
| 2014/0340691 A1 | 11/2014 | Smith | |
| 2015/0233962 A1 | 8/2015 | Tchoryk et al. | |
| 2015/0282707 A1 | 10/2015 | Tanabe et al. | |
| 2015/0309289 A1 | 10/2015 | Nakamura | |
| 2016/0282468 A1 | 9/2016 | Gruver et al. | |
| 2016/0309065 A1 | 10/2016 | Karafin et al. | |
| 2016/0313553 A1 | 10/2016 | Song et al. | |
| 2017/0243373 A1 | 8/2017 | Bevensee et al. | |
| 2018/0031367 A1 | 2/2018 | Smith | |
| 2018/0167602 A1 | 6/2018 | Pacala et al. | |
| 2018/0213207 A1 | 7/2018 | Wilson et al. | |
| 2018/0252513 A1 | 9/2018 | Takashima | |
| 2019/0250396 A1* | 8/2019 | Blanche | G02B 26/101 |
| 2019/0268068 A1 | 8/2019 | Dacha et al. | |

OTHER PUBLICATIONS

Stuart, D., et al., "Fast algorithms for generating binary holograms," arXiv:1409.1841v1 [physics.optics] Sep. 5, 2014, Clarendon Laboratory, University of Oxford, Parks Road, Oxford, OX1 3PU, UK, retrieved on Jul. 5, 2016, https://arxiv.org/pdf/1409.1841, 10 pages.

"Dual-Axis Analog MEMS Pointing Mirror," TALP1000B, Texas Instruments, SLB5006A, Nov. 2004, Revised Sep. 2009. 6 pages.

Rodrigo, et al., "High-Speed Phase Modulation Using the RPC Method with a Digital Micromirror-Array Device," Optics Express, vol. 14, No. 12, Jun. 12, 2006, 6 pages.

"LCOS-SLM (Liquid Crystal on Silicon—Spatial Light Modulator)," Hamamatsu, X10468/X13267/X13138 Series, Cat No. KACC1172E13, Sep. 2015, 9 pages.

"Lens (Optics)," Wikipedia, https://en_wikipedia.org/wiki/Lens_(optics), Aug. 8, 2020, 15 pages.

* cited by examiner

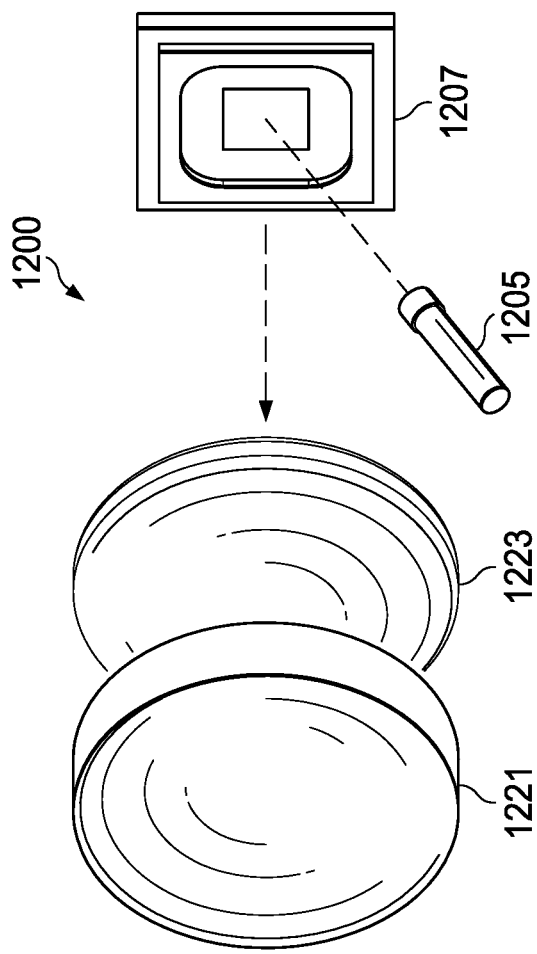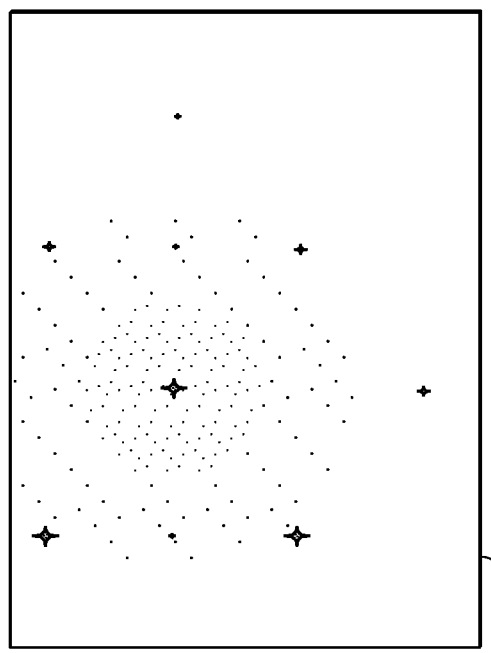
FIG. 12

LIDAR SCANNING WITH EXPANDED SCAN ANGLE

CROSS REFERENCE TO RELATED APPLICATIONS

This application is a Divisional Application of U.S. patent application Ser. No. 15/591,974, filed May 10, 2017, which claims the benefit of priority to U.S. Provisional Patent Application Ser. No. 62/334,810, filed May 11, 2016, entitled "DMD LIDAR Scanning Optics, and Correction of DMD Aberrations Using Holographic Patterns," which Applications are hereby incorporated herein by reference in their entireties.

TECHNICAL FIELD

This relates generally to light detection and ranging (lidar) systems, and more particularly to lidar systems having a scan beam with an expanded scan angle.

BACKGROUND

The term "lidar" or "LIDAR" is a portmanteau of the words "light" and "radar" to describe systems using light for ranging and depth imaging systems. More recently, the term lidar is an acronym for "Light Detection and Ranging." In lidar systems, a source transmits light into a field of view, and the light reflects from objects. Sensors receive the reflected light. In some lidar systems, a flash of light illuminates an entire scene. In the flash lidar systems, arrays of time-gated photodetectors receive reflections from objects illuminated by the light, and the time it takes for the reflections to arrive at various sensors in the array is determined. In an alternative approach, a scan beam (such as a raster scan beam) can illuminate a scene in a field of view (FOV) in a continuous scan fashion. A source transmits light or light pulses during the scan. Sensors that can also scan the scan beam pattern, or fixed sensors directed towards the FOV, receive reflective pulses from objects illuminated by the light. The light can be a scanned beam or a moving spot. Time-of-flight computations can determine the distance from the transmitter to objects that reflect the light from the scan beam. The time-of-flight computations can create distance and depth maps. The depth maps are displayed. Light scanning and lidar are used in a variety of applications, including: ranging; metrology; mapping; surveying; navigation; microscopy; spectroscopy; object scanning; and industrial applications. Recently, applications also include security, robotics, industrial automation, and mobile systems. Vehicles use lidar for navigation and collision avoidance systems. Autonomous vehicles and mobile robots use lidar for motion control and collision avoidance.

To scan objects in a FOV, a useful lidar scan beam traverses a large scan angle from the transmitter to the scene, such as between 30 and 100 degrees, or more.

SUMMARY

In described examples of a system for outputting a patterned light beam, the system includes: an illumination source; a positive optical element positioned to receive light from the illumination source and to output converging light; a reflective element positioned to receive the converging light from the positive optical element, the reflective element configured to reflect the converging light to form a scan beam; and a negative optical element to receive the scan beam from the reflective element, the negative optical element configured to output the scan beam to a field of view.

BRIEF DESCRIPTION OF THE DRAWINGS

FIG. 12 illustrates an example of a DMD used to display a diffraction pattern.

DETAILED DESCRIPTION

Figure 1:
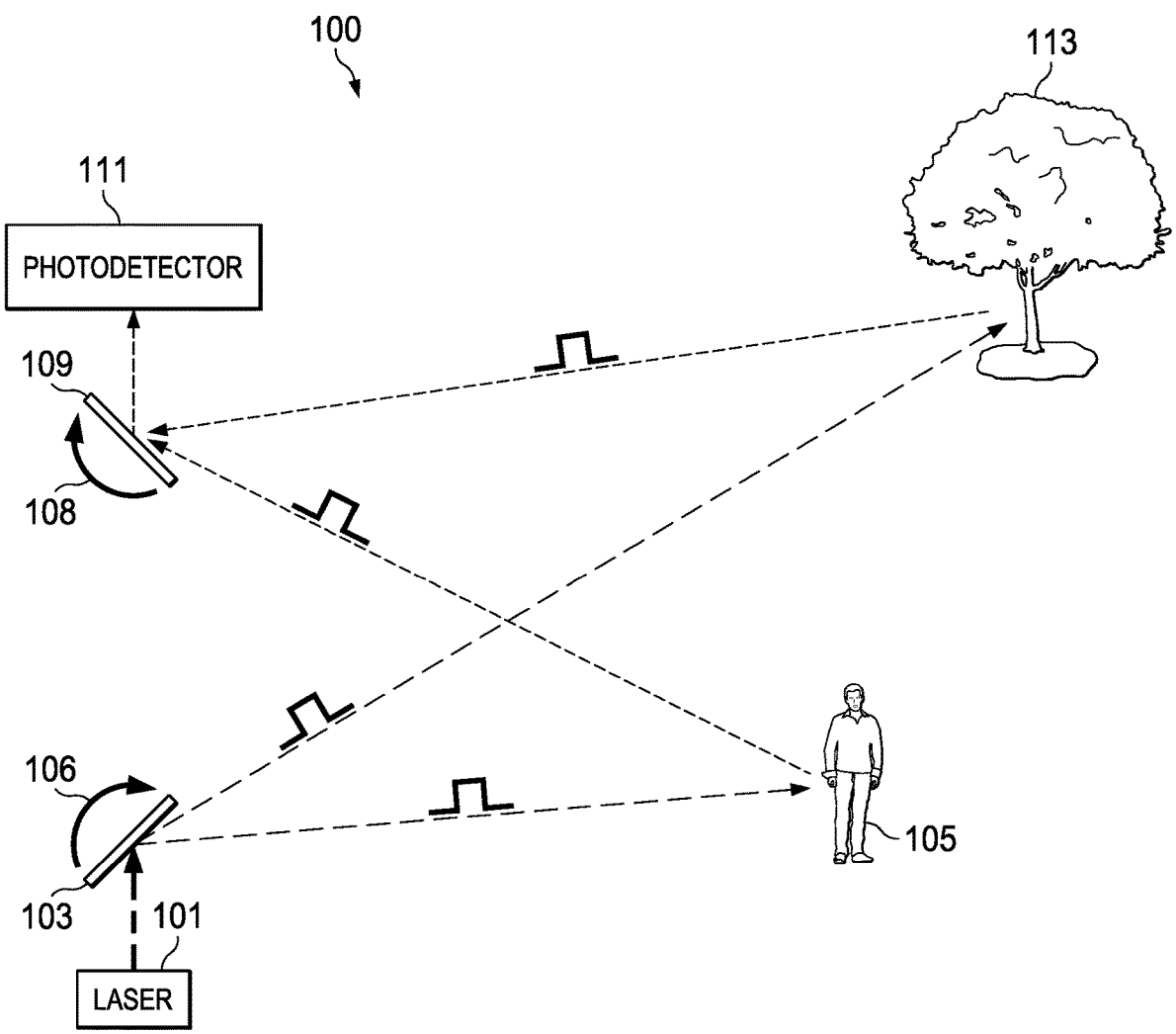
FIG. 1 illustrates a lidar system.

In the drawings, corresponding numerals and symbols generally refer to corresponding parts, unless otherwise indicated. The drawings are not necessarily drawn to scale.

The term "coupled" may also include connections made with intervening elements, and additional elements and various connections may exist between any elements that are "coupled."

In mechanically scanned lidar systems, a rotating mirror or mirrors can cause a beam to scan the scene in the field of view. Sensors detect light reflected from objects in the field of view by backscattering. The fixed scan patterns result from mechanically rotating a laser or from mechanically rotating a mirror reflecting light from a laser or reflecting light received from a collimating lens fed by a laser. These mechanical systems include a variety of mechanical components (such as motors, gears, rotors, and moving mirrors) that have substantial power and weight requirements, require maintenance, are subject to failure, and may require repair.

Lidar is useful in autonomous vehicles. For autonomous vehicle applications, commercially available lidar systems include many components and moving parts, such as mechanical motors, rotators and housings arranged for mounting the system on vehicle roofs. An example vehicular lidar system includes eight assemblies of eight lasers, each to form a sixty-four laser/detector assembly mounted on a vehicle rooftop. The lasers and detectors mount in a rotating housing that rotates at up to 20 Hz. Motors and rotating mechanical parts provide the high-speed rotation. Each of the eight assemblies includes multiple lasers and detectors. Examples of these systems are commercially available from Velodyne LiDAR, Inc. Such systems are relatively high in cost, are mechanically and electrically complex, require special power and maintenance, require substantial processing, and are physically large, so they affect the appearance and exterior surfaces of the vehicle.

In example arrangements herein, ranging and/or depth measurement light detection systems use scan beams with scan angles of greater than 30 degrees. In an example arrangement, an analog mirror or analog MEMS device with a reflective surface is a reflective element with optics arranged to achieve an expanded scan angle. In another arrangement, a digital micromirror device (DMD) is a reflective element with optics arranged to expand the scan angle. In some arrangements, the DMDs display diffraction patterns illuminated to provide scan beam patterns. In a further arrangement, the DMD modifies an optical wavefront by displaying holographic patterns. The use of the DMD to reflect light and modify a wavefront enables constructive interference to form a spot or pattern at an arbitrary distance away from the transmitter. By varying the patterns displayed by the DMD, the spot or pattern can scan the field of view in a raster scan or other scan pattern. Because the system can modify patterns displayed on the DMD, the patterns can be modified to compensate for characteristics in the optics and to compensate for inherent distortion in the DMD device itself. Further, in example arrangements, the beam radius can be more collimated and free from distortion across the expanded scan angles.

In another arrangement, a phase spatial light modulator (PSLM) is a reflective element to change phase of incoming light and input a beam to optics to achieve a scan beam with an expanded scan angle. In a further arrangement, a liquid crystal on silicon (LCoS) device is a reflective element that modulates phase of incoming light rays to form a scan beam and input the scan beam into optics to achieve the expanded scan angle.

In lidar systems including the lidar systems of example arrangements, detectors sense the scan pattern light reflected from objects in the FOV. Time-of-flight calculations determine distance or depth information. In example arrangements, diffractive patterns display on a DMD arranged as a reflective element. At least one coherent light source illuminates the DMD. In one arrangement, the coherent light source is a laser. In another alternative arrangement, the coherent light source is a near infrared laser. In still another alternative arrangement, the light is pulsed. At a predetermined distance in the field of view of the system, an image such as a pattern, a spot or multiple spots or beams form by interference of the light waves traveling from the DMD. Sensors detect reflections from the scan patterns that occur due to backscattering from objects. Distance to the objects can be determined using time-of-flight computations. In example arrangements, a number of iterative or non-iterative algorithms generate the diffractive images. In some of the algorithms, Fourier transforms simulate the desired far field image based on the DMD binary pattern. In an example, inverse Fourier transforms compute the diffraction patterns that are appropriate to form desired scanning patterns in the far field. After computing the complex inverse Fourier transform data, the algorithms perform filtering of the data and quantizing of the complex inverse Fourier transform data. In this manner, example arrangements create binary hologram images for display on the DMD.

In another example, a plurality of two dimensional diffraction pattern templates needed to form a desired scanning pattern are stored for retrieval. In one example, the patterns include raster scanning patterns. In scanning the field of view, the diffractive pattern templates display on the DMD in sequences designed to create the desired scanning pattern. In alternative examples, real time computing computes the two dimensional DMD diffraction pattern data as needed. The real time computation outputs video data to display a scanning sequence using diffractive patterns on the digital micromirror device. In a scene adaptive example, the system resolution increases in the scanning pattern for a selected portion of the field of view with an object of interest. Using coarse resolution over a part of the scene with finer resolution for an area of interest in the scene improves performance. By leaving a portion of the scan pattern in a coarse resolution, processing time improves. By increasing resolution in an area of interest, system performance and resolution improves. In these arrangements, the resolution is defined by the number of individual beam positions covered during the scan or the divergence of the beams themselves.

Further, in some example arrangements, the holographic patterns are modified using field collected test data or optical ray simulations to compensate for distortion in the optical elements, and/or to compensate for beam distortion caused by the reflective element. For example, when a DMD is a reflective element, geometric distortion occurs due to the physical characteristics of the array of micromirrors and the spacing between the mirrors. In some arrangements, the diffraction patterns are modified to compensate and to reduce or eliminate the geometric distortion in the scan beam. In some arrangements, the modifications to the diffraction patterns is a predistortion applied before display of the diffraction patterns, in order to compensate for known distortion or aberration in the system.

FIG. 1 is a block diagram of a lidar system 100. In FIG. 1, system 100 includes a laser (or other light source) 101 arranged to illuminate a mirror 103. A rotating mount 106 rotates mirror 103 so that the laser beam movably scans across the field of view. In FIG. 1, a human FIG. 105 is in one part of the field of view, and a tree 113 is in another part of the field of view. The tree 113 and the human FIG. 105 are located at different distances from mirror 103. In FIG. 1, the light is shown pulsed.

When a pulse of laser energy enters the field of view from the surface of mirror 103, reflective pulses appear when the laser light illuminates an object in the field of view. These reflective pulses arrive at mirror 109. Mirror 109 can also movably rotate on a rotating mount 108. The reflective pulses reflect into a photodetector 111. The photodetector 111 can be any of a number of photodetector types; including avalanche photodiodes (APDs), photocells, and/or other photodiode devices. Imaging sensors such as charge-coupled devices (CCDs) can be the photodetectors.

As shown in FIG. 1, the photodetector 111 receives reflective light pulses. Because the time the transmit pulses are transmitted from laser 101 onto mirror 103 is known, and because the light travels at a known speed, a time-of-flight computation can determine the distance of objects from the photodetector. A depth map can plot the distance information.

Figure 2:
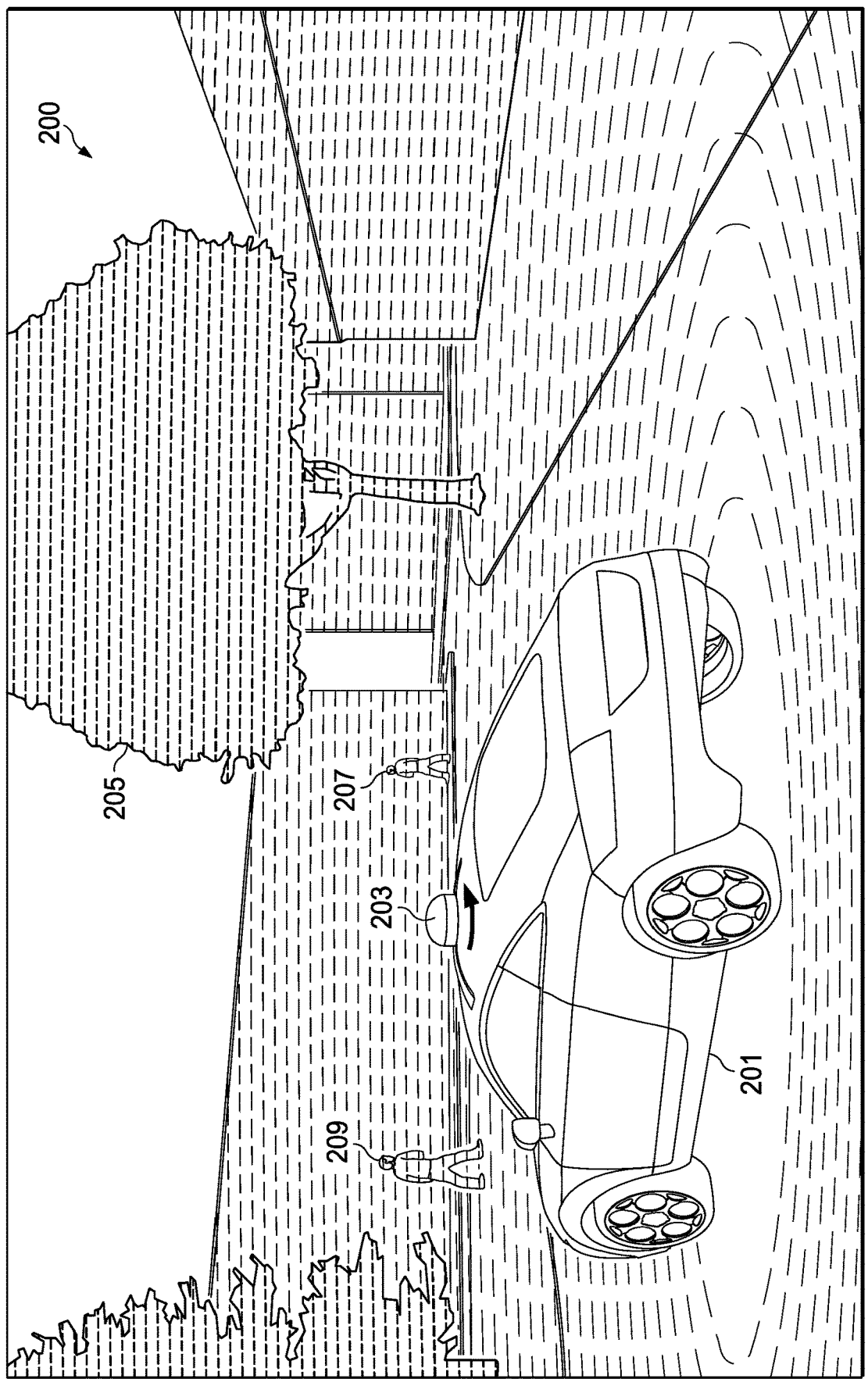
FIG. 2 illustrates a lidar system in a vehicular application.

FIG. 2 is a block diagram of an example vehicle mounted lidar system 200, such as in autonomous vehicle applications. In FIG. 2, a car 201 includes a mechanically rotating lidar system 203 mounted on the rooftop of the vehicle. The rotating lidar system transmits laser pulses and measures corresponding reflections from objects around the system. Using time-of-flight calculations for the reflections based on the speed of light, the system can compute distances. Lidar systems for autonomous vehicles are available from Velodyne LiDAR, Inc. An example system has sixty-four lasers arranged with corresponding detectors mounted in a rotating housing with a rotator motor that rotates the housing at up to 20 Hz. This system requires power to the motor, the many lasers, and the many detectors, and it requires substantial physical space on the vehicle's roof.

Figure 3:
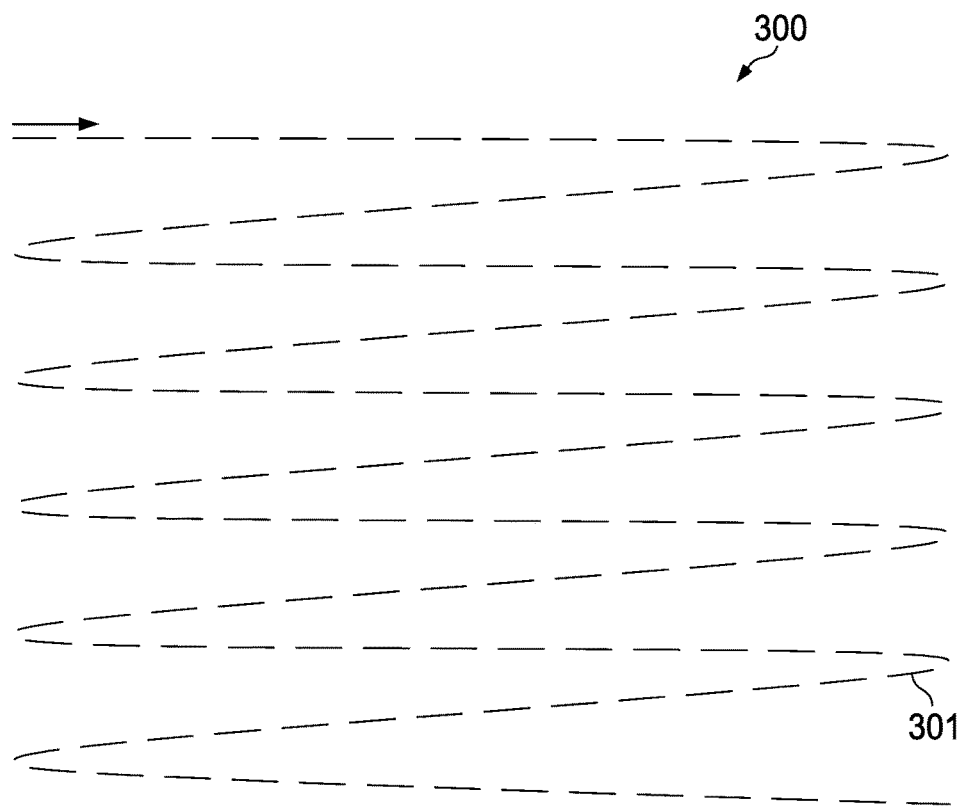
FIG. 3 illustrates a raster scan pattern.

FIG. 3 depicts in a simple diagram a representative pattern for scanning a scene using light. In the example of FIG. 3, a "raster" pattern shown by line 301 proceeds horizontally along a line position from one side of a field of view to the opposing side. The raster pattern returns to scan across the scene at another horizontal position vertically displaced from the first row. The pattern 300 shown in FIG. 3 illustrates a common scanning pattern for a single spot or beam. However, the various arrangements can use any number of alternative scanning patterns.

An important technology for light processing is DLP® technology from Texas Instruments Incorporated ("TI"). TI DLP® home and cinema projectors, televisions, and sensors are in widespread use. These systems use one or more spatial light modulators having digital micromirror devices (DMDs), a reflective spatial light modulator technology developed by Texas Instruments Incorporated. In a DMD, a two dimensional array of mirrors is formed. Each mirror is over a hinged torsional tilting mechanism. Electrical signals control the torsion to tilt the mirrors. The mirrors each have a corresponding data storage unit that are each individually addressable, and each micromirror can be switched between two states many thousands of times per second. DMD devices available from Texas Instruments Incorporated can include many thousands and even millions of the micromirrors and can support various video resolutions. DMDs are reliable and robust especially as a diffractive beam scanner, because even if substantial portions of the array of micromirrors become inoperable, the high number and small size of the digital micromirrors achieve inherent redundancy. DMDs have proven to be highly reliable, long life, solid-state devices for processing light. Because a DMD reflects light and each micromirror has an ON state and an OFF state, the DMD acts as a binary amplitude modulator.

Figure 4:
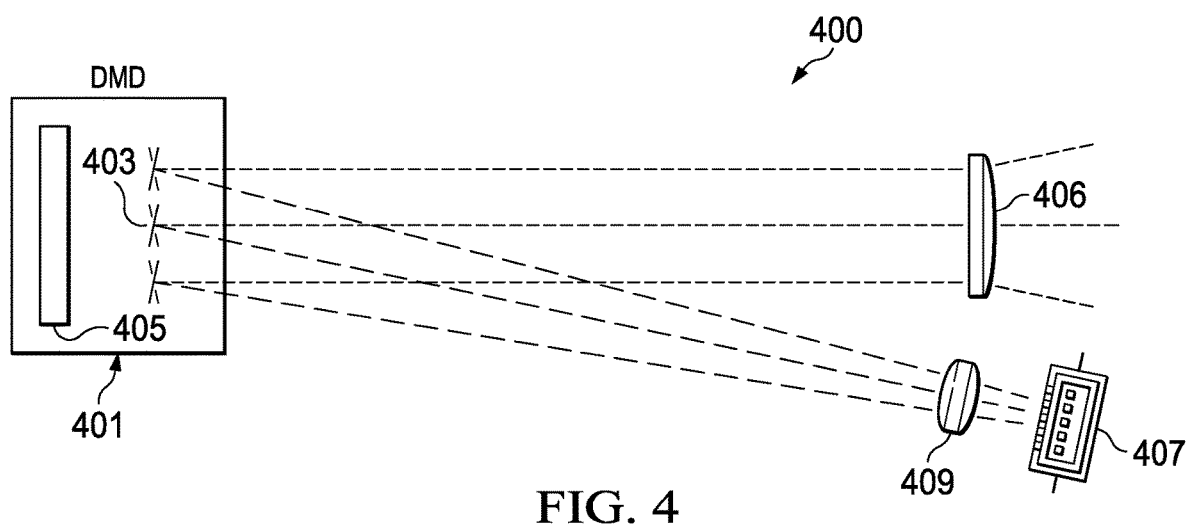
FIG. 4 illustrates a projection system using a DMD.

FIG. 4 depicts in a simplified block diagram a DMD used as a spatial light modulator (SLM) in an image projector system. In system 400, a single light source 407 and illumination optics 409 direct light from the light source onto the face of a DMD 401. Some systems use multiple light sources such as red, green and blue light sources. Some color light systems use color wheels to create colored light from a single light source. Some systems use multiple DMDs. DMDs such as DMD 401 are manufactured using microelectromechanical system (MEMS) technology based in part on semiconductor device processing. An array of micromirrors 403 is disposed over a semiconductor substrate 405. In an example, the micromirrors include aluminum faces and are each mounted on a hinged torsion mechanism. The micromirrors 403 attach to a torsion hinge and can be tilted using electronic signals. The signals are applied to electrodes for each micromirror that control a tilt by applying torsion to pivot the micromirrors about an axis. In an example DMD device, a two dimensional array of thousands or perhaps millions of the micromirrors form a WGA, XGA, 720p, 1080p or higher resolution imaging device. The micromirrors 403 reflect illumination light from the illumination optics 409 to a projection lens 406. A beam of light projects from the system 400. By displaying an image using the DMD and illuminating the DMD micromirrors, the reflected beam of light can include an image for display on a surface such as a screen or wall. The micromirrors 403 are individually addressable, and each has an associated storage memory cell that determines the state of the micromirror during an active illumination period.

The micromirrors 403 each have two addressable states: a first "ON" state; and a second "OFF" state. In the ON state, the micromirrors 403 in FIG. 4 tilt in a first position away from a FLAT position, which in the plan view of FIG. 4 is aligned vertically. The FLAT position is the position a mirror takes when it is unpowered. The tilt occurs due to signals on an electrode that cause the torsion hinges to flex. In system 400, the micromirrors 403 in the ON state reflect incoming light from illumination optics 409 outwards to the projection lens 406. In the OFF state, the micromirrors 403 tilt to a different position. In this example arrangement, mirrors in the OFF state reflect the light away from the projection lens 406. In some arrangements, the OFF state light reflects to a "light dump" (not shown) or thermal energy collector. By varying the tilt positions using electrical control signals, each of the micromirrors 403 can direct reflected light to the projection lens 406. In at least one example, the FLAT position is 0 degrees, and a DMD from Texas Instruments Incorporated has an ON state tilt of about +12 degrees and an OFF state tilt of about −12 degrees. Other DMD devices provide different tilt angles, such as +/−10 degrees, or +/−17 degrees.

This type of DMD is commercially available and sold by Texas Instruments Incorporated. For example, the Texas Instruments Incorporated device DLP3000 has an array of 608×684 micrometer sized mirrors, equating to more than 400,000 micromirrors. The DLP3000 is one example DMD but many different DMD devices are available from Texas Instruments Incorporated.

In projection systems using a DMD, illumination optics provide a cone of light onto the DMD while the mirrors tilt "on" or "off" to provide the displayed image. Projection optics then focus that image onto a surface for display. Various display systems use DMDs as projectors. Applications include: theatre and conference room projectors that display on a wall or screen; rear projection televisions that project onto a display screen; home projectors; sales or presentation projectors; hand held and pico-projectors; heads up displays for aviation, marine and automotive applications; virtual reality and wearable goggles; personal video players displays; and smart glasses displays. Each of these applications uses the DMD as a reflective spatial light modulator.

In another arrangement, the two-dimensional array of micromirrors in a DMD can act as a diffraction grating. The pitch (the spacing between the mirrors) of the DMD devices varies from a few microns to about fourteen microns. The pitch of these devices is small enough, when compared to the wavelengths of coherent light sources such as lasers, to exhibit significant diffraction. In projection systems, the diffraction effects are not desirable, and these effects are minimized by optical design.

In certain example arrangements, a DMD is a useful reflective element in a lidar scanning beam. However, without special optics, the relatively small active area of a DMD results in a small exit beam size. A small beam size at the transmitter results in an increasing beam divergence angle in the far field, which is less desirable than a small beam divergence angle in a scanning application.

Figure 5A:
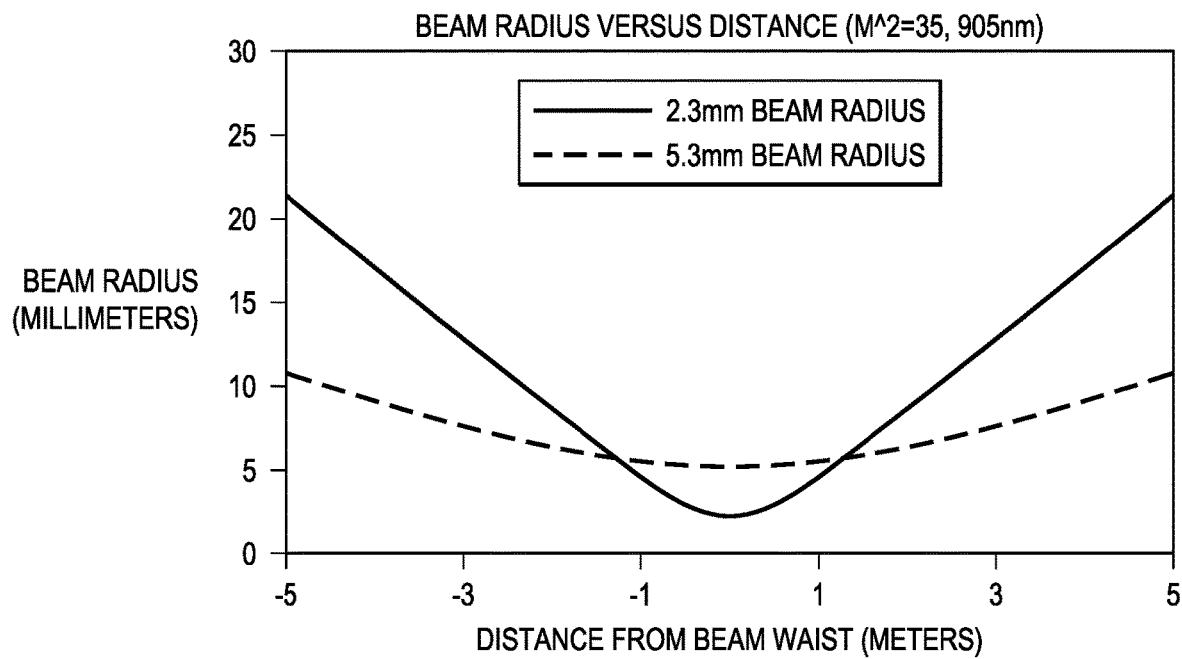
FIGS. 5A and 5B illustrate, in two graphs, a beam radius plotted against distance from a transmitter.
Figure 5B:
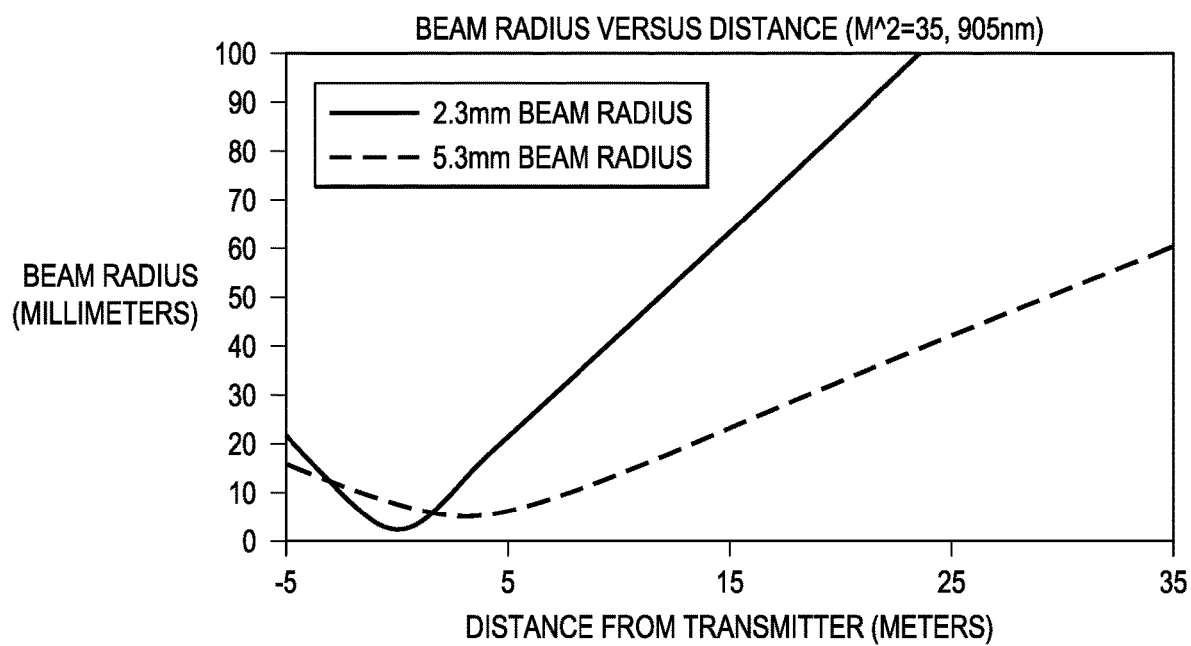

FIGS. 5A and 5B illustrate the relationship between the beam radius at the exit of a beam transmitter and scan beam divergence at a distance from the transmitter. In FIG. 5A, for a beam of 905 nanometer wavelength with a beam quality factor M^2 of 35, the beam radius is plotted against the distance from the exit of the transmitter. The curve labeled "5.3 millimeter" shows the results for a beam having a radius of 5.3 millimeters at the exit (the origin 0 on the horizontal axis.) As the distance from the origin increases, the beam radius plotted on the vertical axis also increases. For the beam of 5.3 millimeters, at a distance of 5 meters, the beam radius is slightly greater than 5 millimeters. In FIG. 5A, a second beam having a smaller radius at the exit of the transmitter is plotted. The curve labeled "2.3 millimeters" shows a beam having a radius of 2.3 millimeters at the origin on the horizontal axis shows that at 5 meters from the origin, the beam radius is over 20 millimeters. The curves in FIG. 5A illustrate that a smaller beam radius at the origin results in a beam with wider beam divergence as the distance from the transmitter increases. A beam with larger diameter at the exit of the transmitter has lower beam divergence in the far field at a distance from the transmitter. Conversely, a beam with small diameter at the exit of the transmitter has greater divergence in the far field at a distance from the transmitter. For a beam used to scan a field of view such as in a lidar system, a smaller beam divergence is desired.

FIG. 5B further illustrates the point. In FIG. 5B, the beam radius for the same two beams is shown at increasing distances from the transmitter exit, at the origin or "0" on the horizontal axis. As the distance increases up to 35 meters on the horizontal axis, the beam radius also increases. For a beam of 5.3 millimeters at the origin, the curve labeled "5.3 millimeters" shows that at a distance of 35 meters from the transmitter exit, the beam radius has increased to about 60 millimeters. In comparison, for the beam having a radius of 2.3 millimeters at the origin on the horizontal axis, the curve labeled "2.3 millimeters" shows that a distance of about 25 meters from the transmitter exit, the beam radius has already reached 100 millimeters. Thus, the beam divergence for a smaller initial beam radius is much greater than for a beam having larger initial beam radius.

As described hereinabove, in some arrangements a DMD is a reflective element in a lidar transmitter. In a lidar scan beam transmitter where a DMD device is used as a reflective element without the use of optics, the scan angle that can be achieved is limited to an angle of arcsin(wavelength/pixel pitch). In an example, using light with a wavelength light of 905 nanometers while using a DMD device with a pitch of about 7.6 microns, the scan angle is limited to about 6.8 degrees. This scan angle needs to increase by a factor of about 5-15× or more to achieve a useful scan angle for a lidar system. The scan angle needs to be between 30 to 100 degrees, or more.

Figure 6:
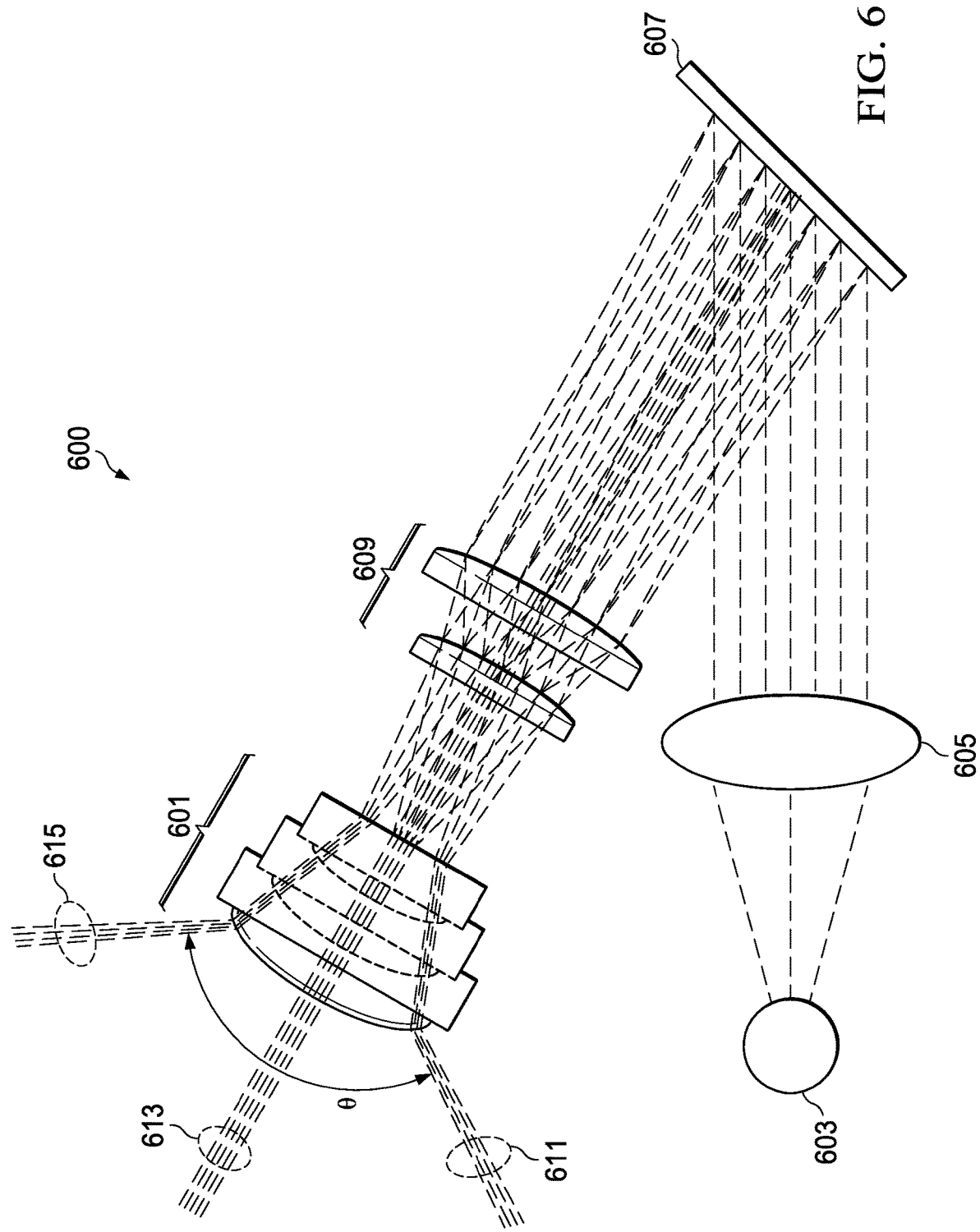
FIG. 6 illustrates a lidar system arrangement.

FIG. 6 is a block diagram in a plan view for an example arrangement using a "reverse telescope" technique to expand a scan angle in a lidar system using a reflective element. In the system 600 of FIG. 6, a negative optical element, here shown implemented using a lens group 601, is arranged with an illumination source 603, which can be a laser including a near infrared laser source and optics to condition the output of the light source and focus light rays onto the reflective element 607. In this example, the reflective element 607 is implemented using a DMD device, and the negative optical element 601 can be part of a reverse refractive telescope. In FIG. 6, the scan beam is shown in ray tracings at three different scan positions 611, 613, 615 to illustrate the total scan beam angle that can be achieved. Additional positive optical elements 609 focus and converge the output rays leaving the reflective element 607 into the input of the negative lens group 601. In an example, the optical elements 609 are positive, converging the light rays from the reflective element 607, and the lens group 601 is negative, expanding the angle that can be covered by the light rays of the scan beam in the FOV. In an example, the positive optical element 609 and the lens group 601 taken together form a reverse refractive telescope. In another example, the positive optical element 609 and the lens group 601 taken together form an afocal lens. The total scan angle θ is indicated by the beam positions 611 and 615. In an arrangement, the scan angle is greater than about 30 degrees, and in another arrangement, is between 30 and 100 degrees.

The arrangement in FIG. 6 increases the scan beam angle θ over the possible scan angle obtained for a transmit beam employing a DMD as the reflective element without special optics. However, the beam diameter at the DMD 607 exit is comparatively small, as described hereinabove with respect to FIGS. 5A and 5B, increases the beam divergence in the field of view.

Figure 7:
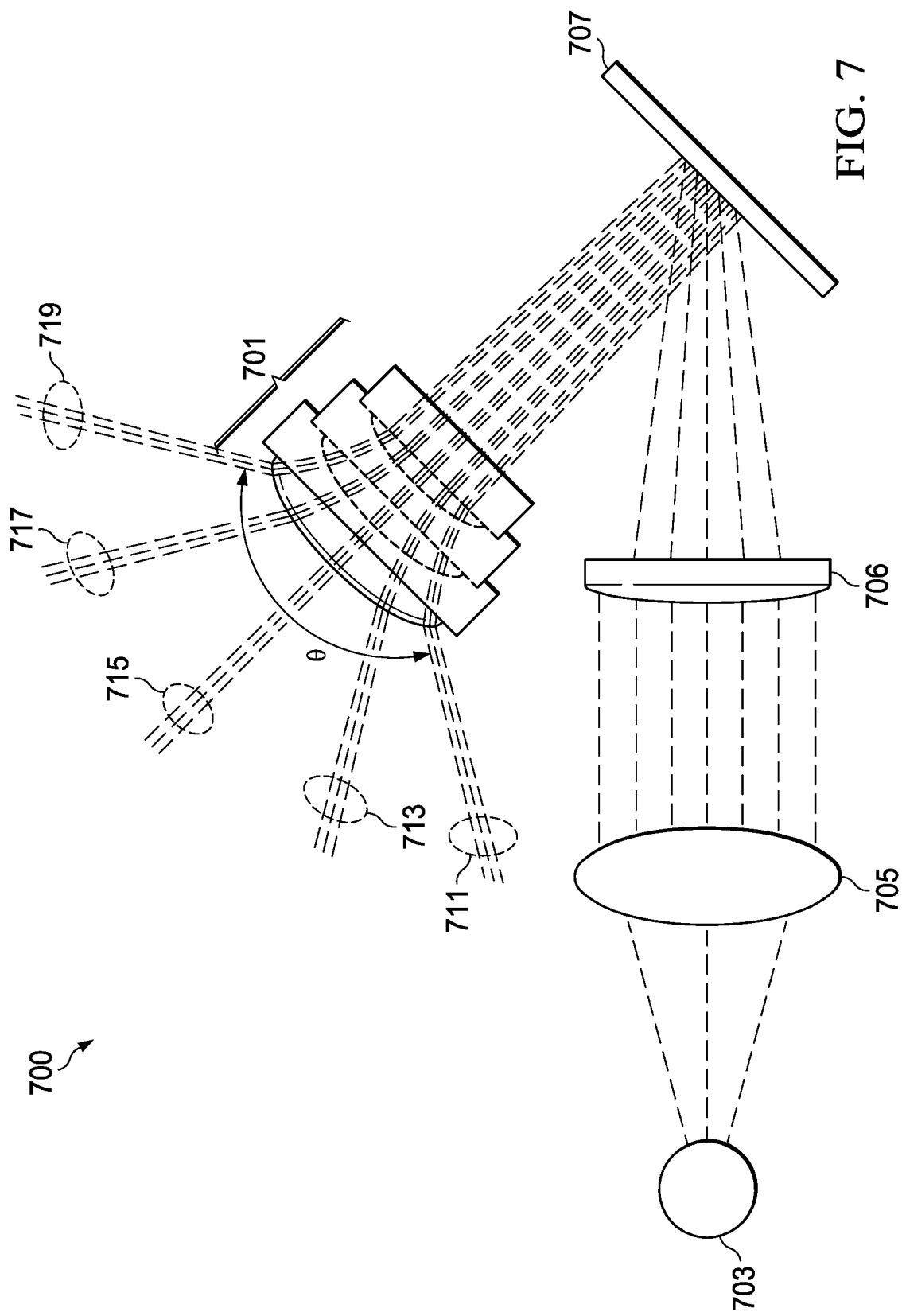
FIG. 7 illustrates another lidar system arrangement.

FIG. 7 is a block diagram of an additional example arrangement for a beam scanning system with an expanded scan angle. System 700 is shown with a reflective element 707 arranged with a negative optical element 701. In FIG. 7, similar reference labels are used for similar elements in FIG. 6, for ease of understanding. For example, the negative optical element 701 corresponds to the negative optical element 601 in FIG. 6. An illumination source 703 such as a laser or a near infrared laser is shown emitting rays to a collimator 705. In the arrangement of FIG. 7, the reflective element 701 is positioned between a positive optical element 706 that converges the rays onto the face of the reflective element, and the negative optical element 701, in contrast to the arrangement in FIG. 6 where the reflective element is outside the optical path. Taken together, the positive optical element and the negative optical element form a reverse telescope or a reverse afocal lens. The collimated rays are focused by optical element 706 to converge on the surface of reflective element 707. Reflected rays from the surface of the reflective element 707 are input into the negative optical element 701, here shown as a part of a reverse refractive telescope. The scan beam is shown in five different positions to illustrate the scan angle θ that is obtained. Position 711 is the leftmost position in this top view of system 700, the beam can then scan through position 713 to the center position 715, through position 717 to the rightmost position 719. In an example, the scan angle θ from left to right can exceed 30 degrees. In a further example, the scan angle θ can exceed 50 degrees. In another example, the scan angle θ obtained by the arrangement in FIG. 7 can be between 30 and 100 degrees. In additional examples, the scan angle θ is greater than 45 degrees. Example arrangements achieve an increased scan angle compared to arrangements without the negative optical element arranged with the reflective element.

In contrast to the arrangement in FIG. 6, in system 700 the reflective element 707 is positioned within the optical path of elements 706 and 701, with the light rays focused by a positive optical element 706 to converge on the reflective surface of reflective element 707. This arrangement enables a larger beam diameter leaving the reflective element 707. As described hereinabove, the larger beam diameter at the transmitter results in less beam divergence in the far field. The ray tracings of the scan beam at positions 711, 713, 715, 717, and 719 in FIG. 7 illustrate less beam divergence than the corresponding beam positions shown in FIG. 6.

Reflective element 707 is, in one example arrangement, an analog MEMS mirror device. Analog MEMS mirror devices are commercially available. The analog MEMS mirrors rotate on two axes and so can obtain a variety of tilt and rotate positions. By directing coherent light onto the surface of the analog MEMS mirror, the rotate and tilt motion of the analog MEMS mirror allows a scan beam to be generated that traverses a pattern. The analog MEMS mirror device is fabricated using a process similar to semiconductor processing technologies. The reflective mirror surface can be a metal such as gold or aluminum. The analog MEMS mirror is a solid-state device, in that input electrical signals (not shown in FIG. 7 for simplicity) cause the MEMS mirror to rotate and tilt, no additional mechanical systems, gears, rotors or motors are needed. Unlike a DMD MEMS device in which the micromirrors are placed in either one or another of two discrete tilt positions "ON" and "OFF" as described hereinabove, the analog MEMS device mirror can take a variety of positions obtained by applying a range of voltages to electrodes that cause the mirror to move. The mirror moves on two axes so a reflected beam can scan a scene in front of a transmitter by rotating and tilting the MEMS mirror to direct the reflected scan beam.

As shown in FIG. 7, the scan angle θ of the beam that is obtained is quite large, as shown by the range from the beam in one position at 711 to the opposing beam position at 719. Because the incident light is converged before the reflective element 707, the exit beam obtained is larger in diameter than for the arrangement in FIG. 6. Also, as described hereinabove, the larger diameter exit beam achieves smaller beam divergence in the far field. Accordingly, a scan beam with smaller beam radius in the FOV, and with an expanded scan angle, is achievable.

In the arrangement of FIG. 7, a scan beam has an increased scan angle, but some applications may benefit from using a DMD as the reflective element 707. Use of a DMD device allows for additional compensation due to the ability to display arbitrary patterns on the DMD, as further described hereinbelow.

Figure 8:
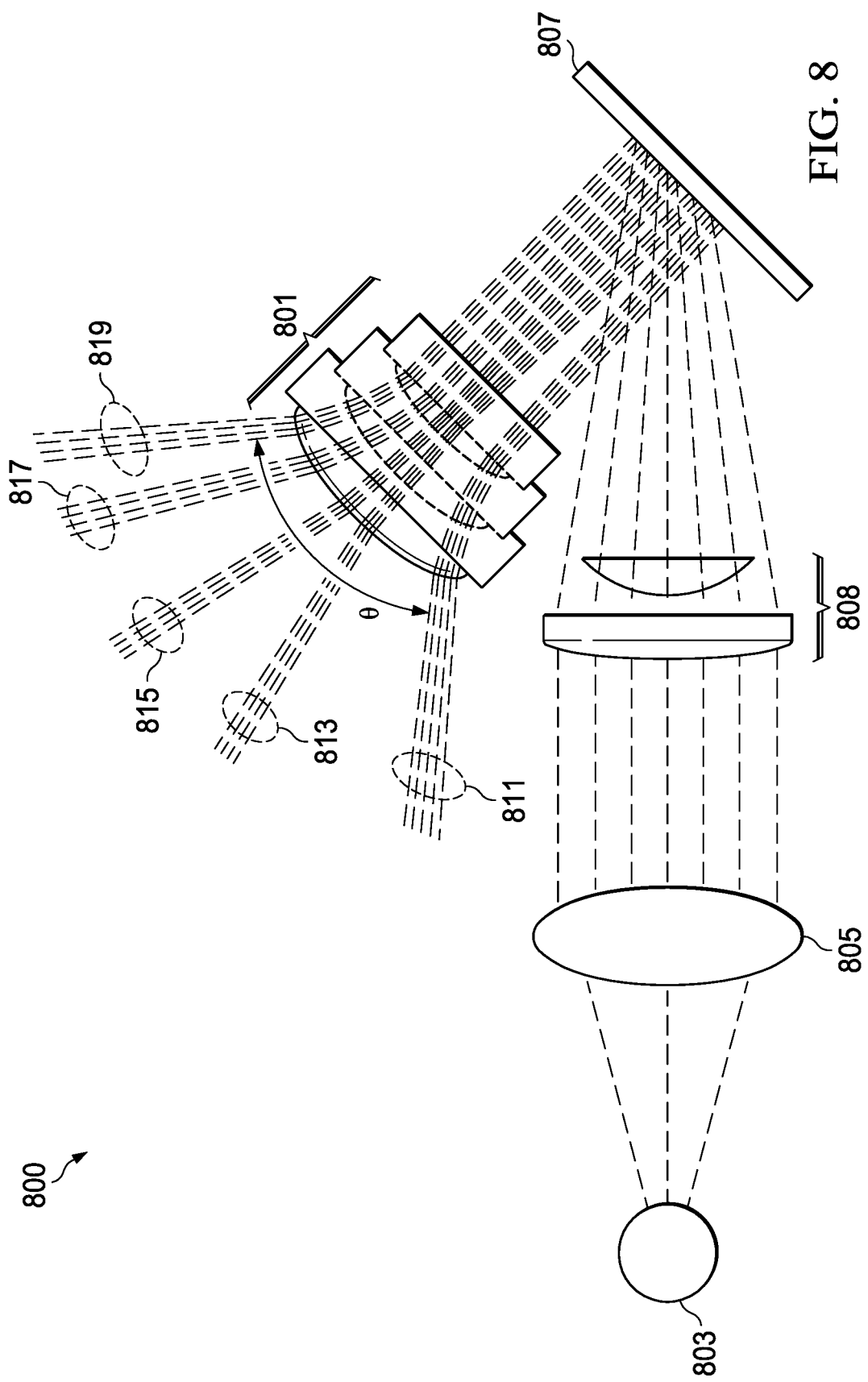
FIG. 8 illustrates a lidar system arrangement using a digital micromirror device (DMD).

FIG. 8 is a block diagram of an alternative arrangement, where a DMD is the reflective element in a lidar transmit system 800 using a portion of a reverse refractive telescope to expand the scan angle. The arrangement of FIG. 8 is otherwise similar to the arrangement of FIG. 7. In FIG. 8, lidar system 800 includes a DMD 807 that reflects incident light to a negative optical element 801, in this example negative optical element 801 is a lens group shown as a part of a reverse refractive telescope. A light source 803 that can be a laser or a near infrared laser emits light rays to a collimator 805. The rays from 805 enter optics 808 that converge the light onto the reflective surfaces of the micromirrors in DMD 807. The lens group 801 is a negative optical element that increases the scan angle. In alternative arrangements, other negative optical elements replace the portion of the reverse refractive telescope. In one example arrangement, afocal lenses can form the negative optical element 801.

In FIG. 8, the scan beam is in a range of positions 811, 813, 815, 817 and 819 to illustrate the expanded scan angle obtained by use of the negative lens group 801 to expand the beam angle.

As shown in FIG. 8, the arrangement provides an expanded scan angle θ. However, as shown by the light ray tracings in FIG. 8, the beam has diverged for reflected light that strikes certain portions of the DMD. For example, at beam position 811, the beam shows diverging rays in the light ray tracing, because the diameter of the beam at position 811 is different from the beam at position 819.

In an alternative arrangement, a phase spatial light modulator (PSLM) is the reflective element. For example, in FIG. 8, a PSLM can be the reflective element 807 in FIG. 8 to form another example arrangement. A PSLM is a device having an array of cells, with each cell imparting a different optical phase delay according to the electrical signal applied to each cell. A PSLM device can have a liquid crystal device (LC), a liquid crystal on silicon device (LCoS) or a microelectromechanical system (MEMS) device. A MEMS PSLM usually has an array of micromirrors that displace in a direction normal to the array plane in response to electrical signals. The function of a PSLM is to change the shape of the optical wavefront incident on the device. The PSLM can impart a linear phase delay on a wavefront thus steering the beam in a different direction. A PSLM can also impart a curved wavefront that can focus the wavefront in a manner similar to a lens. The primary advantage of a PSLM is that it can be quickly reconfigured to steer or focus a beam to a desired direction or focus to a desired plane.

The optical function of a PSLM in a lidar transmitter is different from that of a DMD described hereinabove. When using the DMD, light from the light source is directed onto the DMD array and various pixels are turned on or off. Particular areas or points of interest within the scene can be selected by imposing a spatial linear phase pattern on the PSLM similar to a blazed diffraction grating such that the beam is steered. As a consequence, the light not in the region of interest is directed to an area away from the output optics. In this manner, the PSLM can perform a similar function to the DMD in directing laser light toward the optics and out of the transmitter to steer a scan beam.

A linear phase function displayed on the PSLM directs the laser light in a desired direction. The phase front is altered for each beam direction, causing the beam to scan in a particular pattern required to obtain range or reflectivity image of the scene in the FOV. Furthermore, by displaying a curved phase function on the PSLM, the beam can be focused at an input to the optics.

In yet another example, the reflective element in FIG. 8 is a liquid crystal on silicon (LCoS) device that forms an additional arrangement. The LCoS device can modulate the phase of light received from a light source and can output reflected light rays to the negative optical elements to steer a scan beam. The use of the negative optical elements expands the angle the scan beam traverses in the field of view as described hereinabove.

Figure 9:
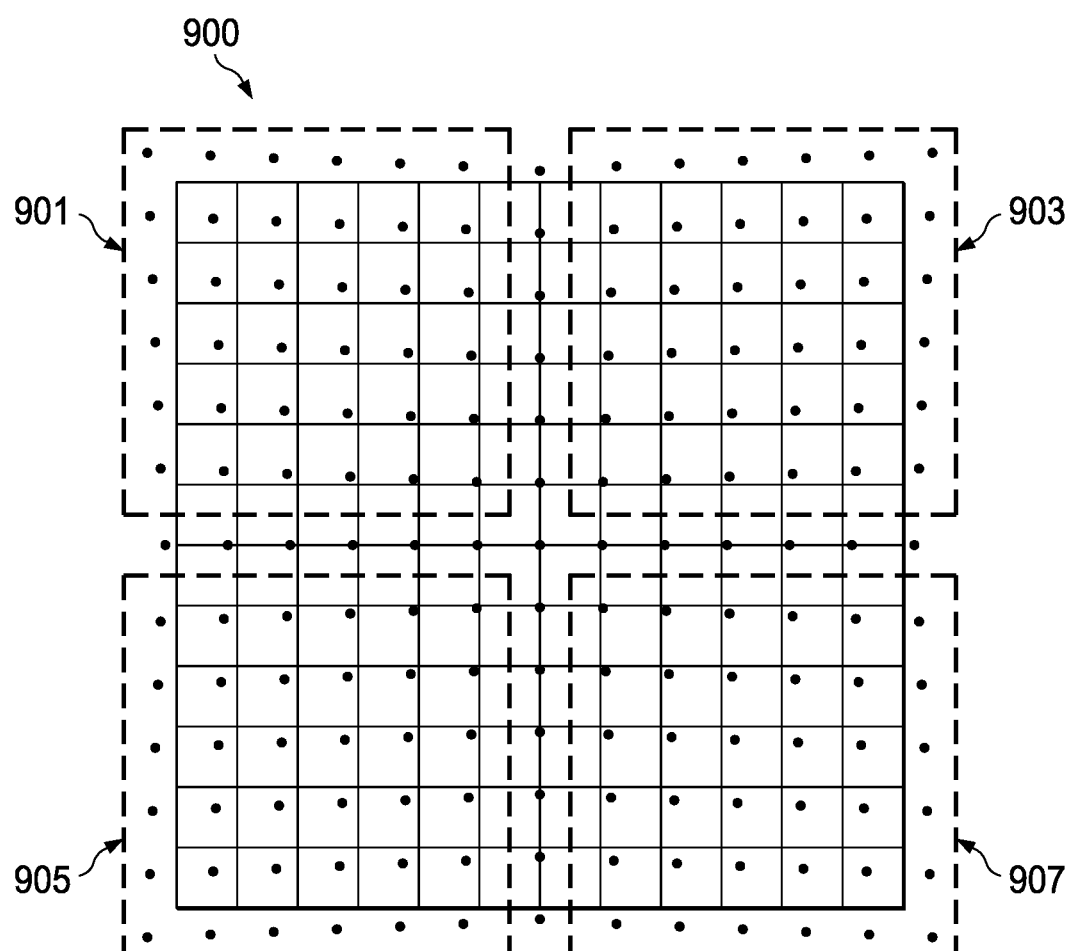
FIG. 9 illustrates distortion of light reflected from a DMD.

A DMD is a useful reflective element for example arrangements, when the DMD is combined with the expansion optics, but aberrations can occur in the scan beam. FIG. 9 illustrates geometric distortion in light reflected from a DMD device through the expanding optics. In FIG. 9, the dots represent the pattern obtained from reflection of light from the scanning DMD system. Even if the DMD diffraction patterns are generated so that the beams are equally spaced in the far field, the optical expansion will result in some distortion of the positions in the far field.

In the center portion of DMD 900 in FIG. 9, the dots representing reflected light align with the gridlines, indicating no distortion. In the regions 901, 903, 905, 907, where the dots represent light reflected from corner regions of the DMD, the dots no longer align with the gridlines, indicating distortion. Because the distortion and the amount of distortion vary according to the location on the DMD that is used, the distortion is referred to as "geometric distortion."

Geometric distortion can be corrected by generating DMD diffraction patterns that pre-distort the beam positions such that they fall on the rectangular grid. This is one form of distortion that can be corrected by the design of the diffractive patterns. In example arrangement, pre-distortion is applied to the diffractive patterns to compensate the distortion.

Figure 10:
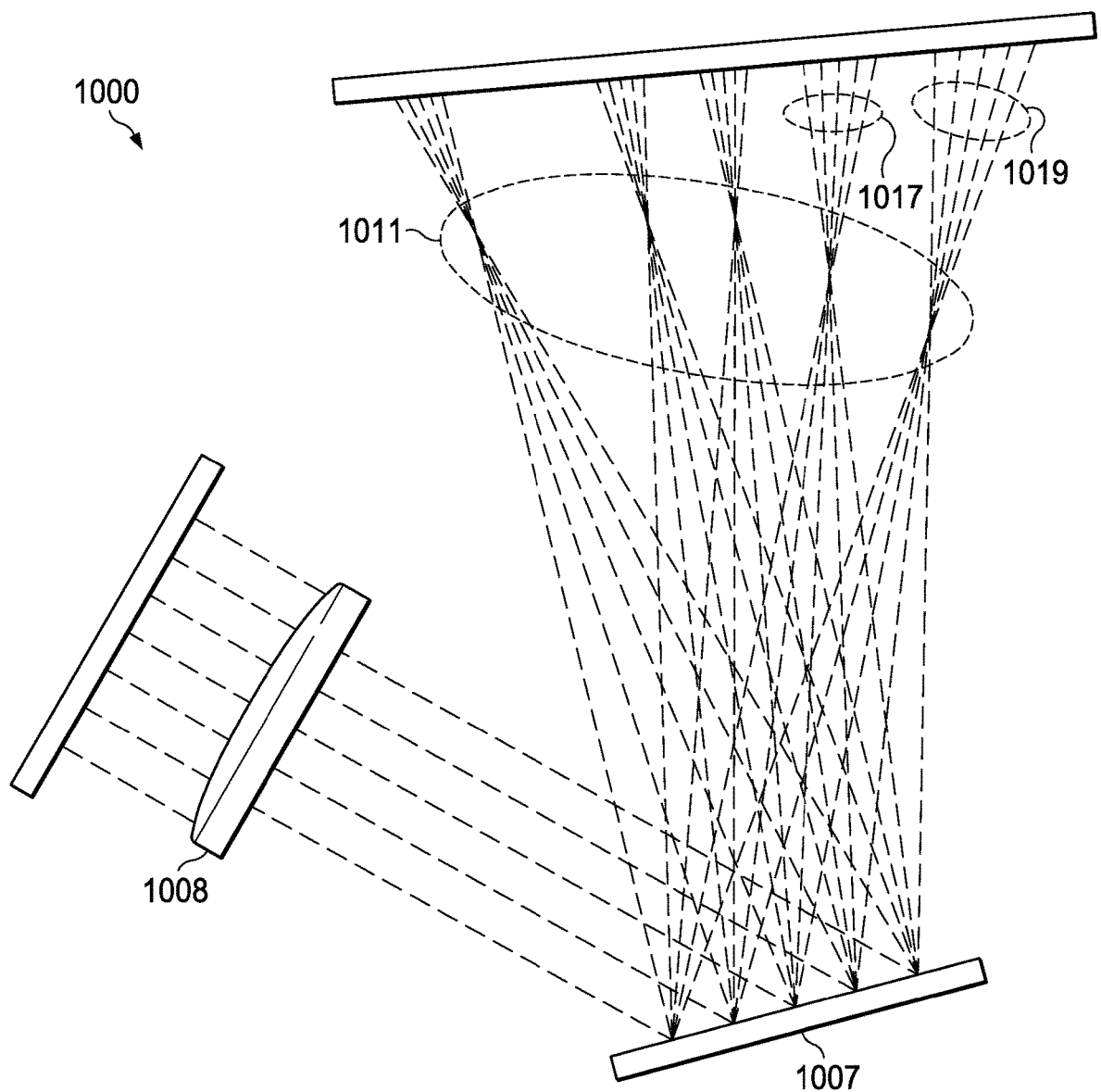
FIG. 10 illustrates an example of a DMD used to reflect light.

The DMD diffractive patterns can also correct another form of optical aberration created by the DMD. FIG. 10 is a block diagram of a system 1000 with a DMD reflecting a converging beam. A light source and collimator (not shown for simplicity) directs light rays into the optical element 1008 that converges the light rays onto the surface of DMD 1007, the DMD having an array of micromirrors. The resulting beam is shown in ray tracings in several beam positions including 1017, 1019 after being reflected by DMD 1007. Region 1011 illustrates the result and the distortion. Because the DMD acts like a diffraction grating in the scan direction, the converging rays will be focused by different amounts according to the diffraction order and scan angle. The different focus amounts result in beam astigmatism. In example arrangements, the astigmatism can be corrected in the generation of the diffractive patterns.

Figure 11:
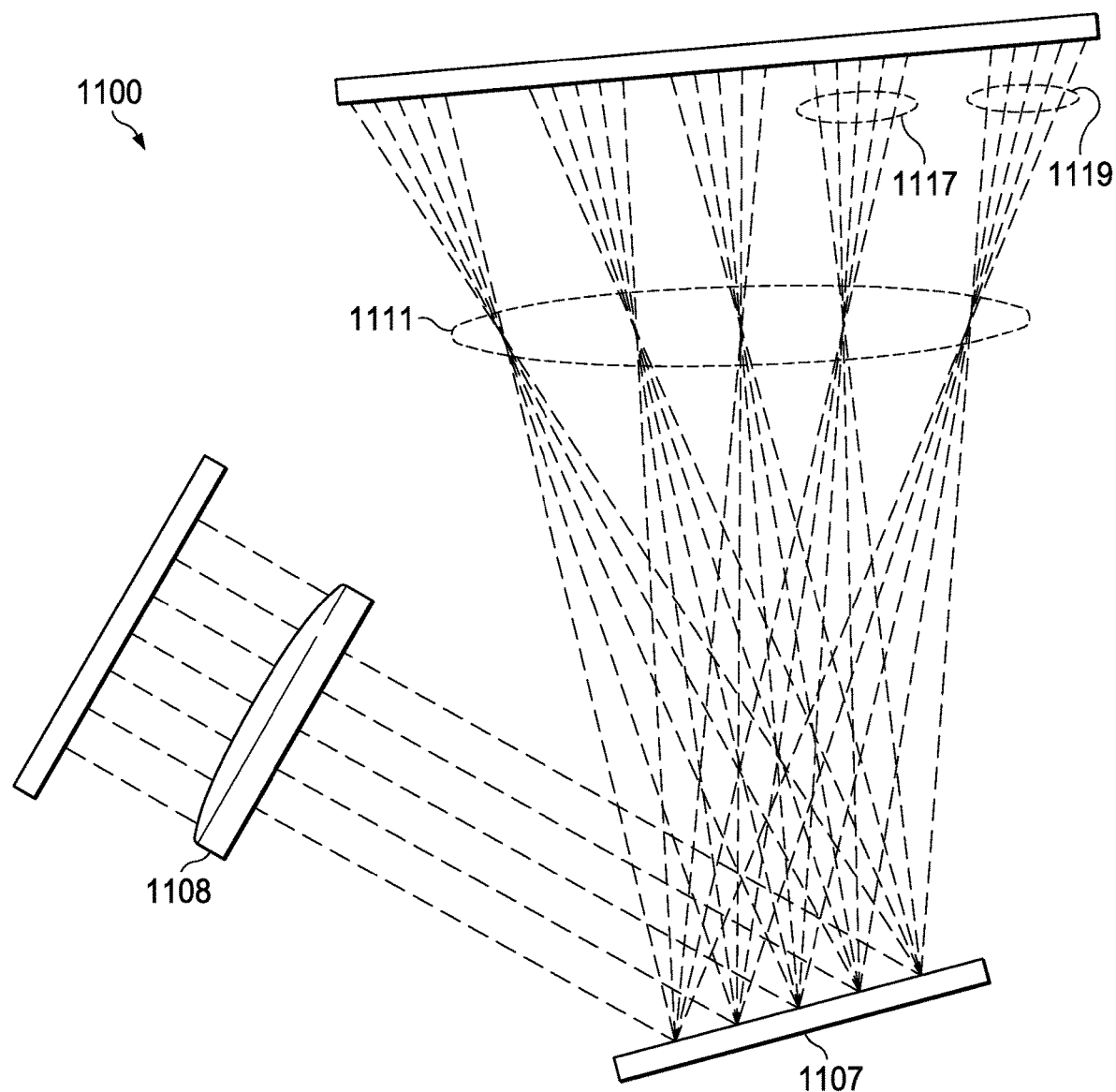
FIG. 11 illustrates an example of a DMD used to reflect light with correction applied to the DMD.

FIG. 11 is a block diagram of a system 1100 similar to system 1000, where correction applied to the DMD corrects for the astigmatism in the DMD. The reference labels in FIG. 11 for elements similar to those in FIG. 10 are similar, for ease of understanding. For example, DMD 1107 corresponds to DMD 1007 in FIG. 10. In FIG. 11, an optical element 1108 converges light rays from a light source (not shown) onto the surface of DMD 1107. The reflected beam is shown in ray tracings at several positions including 1117, 1119. Area 1111 shows the effects of correction for aberrations in the DMD. The focal point of the beams for different scan beam positions is at the same distance from the DMD 1107 as shown in area 1111. This is in contrast to the astigmatism effects shown in region 1011 of FIG. 10, where no correction is applied. The correction changes the pattern displayed on the DMD 1107 to compensate for distortion. By applying a correction that acts as a focusing element, the beams can be correctly collimated for all scan angles.

When illuminated with a coherent light source the DMD can display binary patterns that behave as binary holograms. These binary holograms diffract the light and can produce a variety of image patterns in the far field. Diffraction changes the direction and distribution of light due to traversing apertures such as an opening or slit. On a DMD device, the individual micromirrors and the spaces between the individual DMD mirrors provide a natural diffraction grating. Further, diffractive patterns displayed using the DMD can create desired patterns in a far field image plane. These patterns result from interference (constructive and destructive) between wavefronts of light traveling away from the diffractive pattern displayed on the DMD. The image patterns in the far field are almost unlimited in variety. A single DMD and a single illumination source can form many patterns in the far field image plane.

Co-owned U.S. patent application Ser. No. 15/202,315, filed Jul. 5, 2016, entitled "Methods and Apparatus for LIDAR with DMD," which is hereby incorporated by reference herein in its entirety, discloses the use of diffraction patterns with a DMD to provide scan patterns for lidar systems.

To illustrate the diffractive characteristic of a DMD, FIG. 12 is a block diagram of a far field image result obtained by illuminating an entire DMD micromirror array with a laser illumination source. In FIG. 12, a system 1200 operates by directing the output of a laser 1205 onto the mirror surfaces of DMD 1207. In this example, afocal lenses 1221 and 1223 collect the output light and provide an afocal lens correction to illuminate a larger field of view than can be illuminated in a "lens less" system. However, the use of the afocal lenses 1221 and 1223 is not required, and in alternative arrangements, the system can be "lens less." The far field image shown as 1209 in FIG. 12 is a pattern of spots with a brighter spot in the center, and the pattern of spots symmetrically surrounds the center spot. The pattern 1209 illustrates that the DMD is acting as a diffraction grating for the illuminating laser. In example arrangement, the DMD displays an image containing a series of black and white stripes. The pattern in the far field has spots due to the diffractive properties of the DMD.

An example system can use the diffraction properties of the laser and the DMD to form arbitrary patterns. For example, a pattern of lines can form as shown in FIG. 12. Further, by displaying a particular diffraction pattern using the DMD, the system can create dots or other patterns at any arbitrary position in the field of view of the system. Because the DMD can rapidly switch between different diffractive patterns, a sequence of patterns can display using the DMD, with each diffraction pattern illuminated by the laser. By continuing to display different patterns in the sequence, a scanning beam pattern or moving spot pattern forms at the far field. In this example system, the DMD is acting as a hologram display. The hologram pattern can cause a beam or beams. The beams can result in reflections from objects located at distances from a few centimeters to one hundred meters or even up to several hundred meters from the DMD and illumination source. In a lidar application, a receiver receives the reflections and time of flight calculations determine depth information. The depth information can be visually displayed to an operator or can be used in navigation, collision avoidance and guidance lidar systems.

Because the patterns displayed on the DMD are holograms or diffraction patterns that result in images in the far field, focused optical elements are not required. However, as described hereinabove, example arrangements can include negative optical elements such as portions of a reverse refractive telescope or other negative optical elements to expand the scan angle covered by the scan beam pattern in the field of view. Further positive optical elements placed between the illumination source and the DMD converge the light onto the surface of the DMD, resulting in an increased beam diameter in the reflected beam with corresponding lower beam divergence in the field of view. A rapidly pulsing laser can illuminate the DMD. The laser can be at low average power levels and with short pulse durations that are "eye safe" so that a viewer will not suffer eye damage if the laser light strikes an observer's eye. The system can use infrared, near infrared and other illumination wavelengths.

An example system using a DMD as a diffraction pattern generator or hologram display device is described in a paper entitled "Digital micro mirror device as a diffractive reconfigurable optical switch for telecommunication," by Blanche et. al., Journal of Micro/Nanolithography, MEMS and MOEMS, Vol. 13 (1), January-March 2014, pp. 011104-01 through 011104-05 (hereinafter, "Blanche et. al."), which is hereby incorporated by reference in its entirety. In Blanche et. al., the authors demonstrate that a diffraction pattern on a DMD can produce an image at a desired point in an image plane. In an example system described in Blanche et. al., spot patterns are input as data to optical fibers in an optical switch.

Figure 13A:
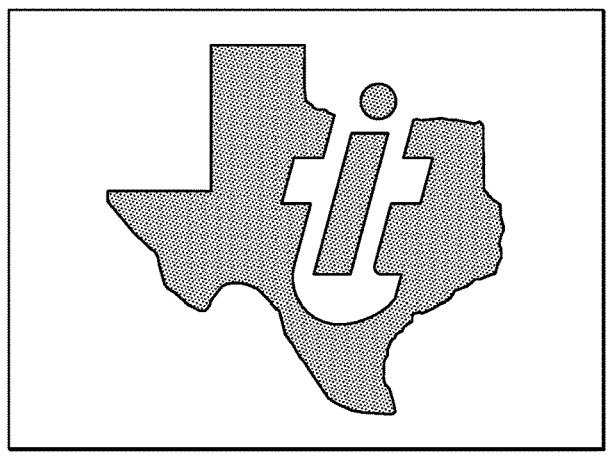
FIGS. 13A, 13B and 13C illustrate a diffraction pattern and corresponding images.
Figure 13B:
Figure 13C:
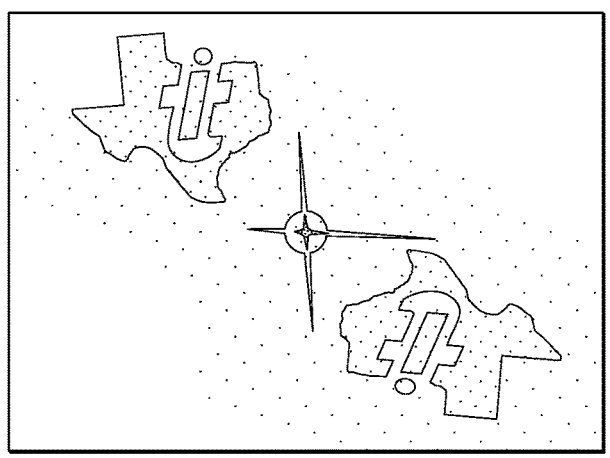

FIG. 13A shows an example desired pattern (described in Blanche et. al.) of a logo of Texas Instruments Incorporated, known as the "TI bug." In FIG. 13B the DMD pattern needed for producing the image by diffraction is illustrated as it would be displayed using a two dimensional DMD array. The pattern in FIG. 13B is not a recognizable image of the logo in FIG. 13A, FIG. 13B shows that the DMD is not projecting images as in an image projection system. FIG. 13C shows the resulting holographic image that results from a laser illumination of the DMD array of FIG. 13B. A bright spot due to the zero order energy, analogous to a DC component of an electronic signal, appears positioned at the center of the image. This zero order component will exist for each diffraction pattern, because the DMD in this arrangement modulates light intensity (amplitude modulation) and not phase. The first order component, which reproduces the desired image, is shown at the upper left of FIG. 13C. The resulting image also has a second first order component image, a conjugate image, formed at the lower right portion of FIG. 13C. The conjugate first order image is flipped about the zero order spot. Each image formed using a diffraction pattern will also have a conjugate image and a zero order spot.

As shown by the diffractive pattern in FIG. 13B, the diffraction or hologram imaging system is not projecting an image through the DMD array such as would be the case for a DMD in a video system using optical projection. The pattern at the far field image plane and the diffraction pattern displayed using the DMD relate mathematically by a Fourier transform. When illuminated by a coherent light source, the diffraction pattern produces wavefronts that interfere constructively and destructively corresponding to the diffracted light. The desired image appears at a plane some distance from the DMD. In example arrangements, a variety of diffraction patterns can display on a DMD mirror array in a sequence to form arbitrary and desired scan patterns at some distance.

The diffraction pattern and the resulting image at the far field plane are related by a two-dimensional Fourier transform, so algorithms for generating these diffractive patterns can use Fourier transforms in example arrangements. Algorithms for generating these patterns for display on the DMD are somewhat more complicated because the DMD is a binary, amplitude only modulator.

Some fast algorithms for generating diffractive patterns or holograms for display on a DMD are described in a paper entitled "Fast algorithms for generating binary holograms," authored by Stuart et al., arXiv:1409.1841[physics.optics], 5 Sep. 2014, (hereinafter, "Stuart et. al.") which is hereby incorporated by reference herein in its entirety. In Stuart et. al., the fast algorithms include an ordered dithering algorithm and a weighted Gerchberg-Saxton algorithm. Example arrangements can use additional algorithms to develop diffraction patterns. An example algorithm includes identifying a far field image pattern to be created in the field of view; zero padding the image pattern; and taking the inverse Fourier transform of the zero padded pattern using a fast Fourier transform. The method continues by quantizing the resulting complex inverse fast Fourier transform (IFFT) data to get a binary pattern for display using the DMD, and sub sampling the binary pattern to arrange it for the particular DMD mirror orientation. By simulating the far field image using FFTs, and observing the resulting far field image, recursive improvements can adjust the diffraction pattern until the desired far field image results. For example, these recursive improvements can compensate for device specific variations in die flatness, such as to obtain the correct far field image without modifying the DMD. In example arrangements, distortion effects such as astigmatism, geometric distortion, and distortion resulting from the physical characteristics of optical elements can be compensated by further modifying the diffraction patterns displayed on the DMD. Distortion can be reduced or eliminated in the scan beam of example arrangements by applying correction to the diffraction patterns, as further described hereinbelow.

Figure 14:
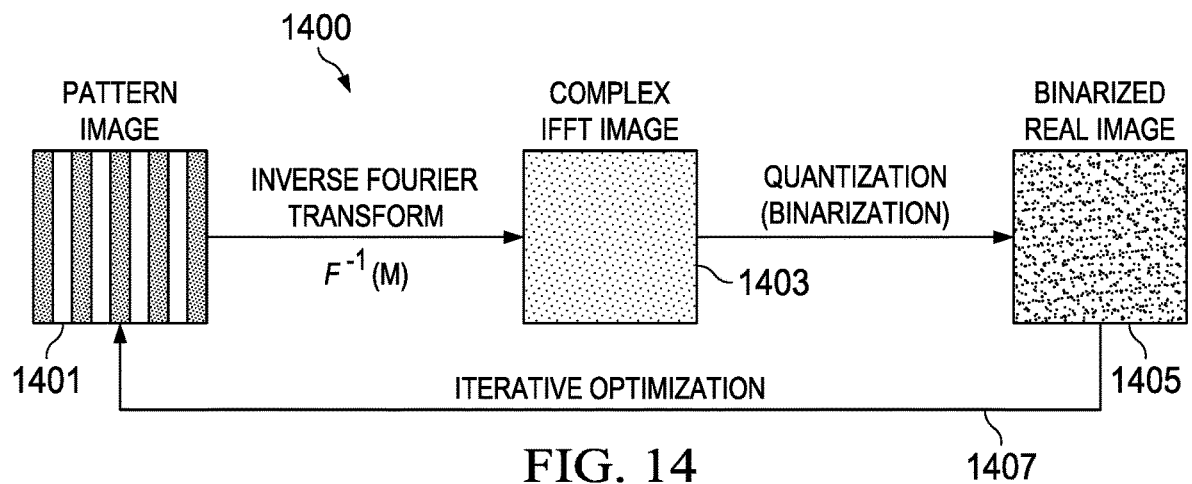
FIG. 14 is a block diagram illustrating one algorithm for generating a DMD binary, amplitude-only diffraction pattern.

FIG. 14 shows a block diagram illustrating one algorithm for generating a DMD binary, amplitude-only diffraction pattern. FIG. 14 shows a desired pattern for a far field image, "Pattern Image" 1401. One simple method of creating a DMD pattern that produces the desired far field image 1401 is to apply an inverse fast Fourier transform (IFFT) to the image. To compute the IFFT efficiently, various computing techniques such as a discrete fast Fourier transforms, or "DFFT" are useful. Processors optimized for DFFT computations, such as co-processors, digital signal processors, and vector processors are useful to compute the inverse DFFT. As shown in FIG. 14, the result is a two-dimensional array labeled "Complex IFFT Image" 1403. As shown in FIG. 14, the Complex IFFT Image 1403 has no obvious relationship to the Pattern Image 1401. The Complex IFFT image includes components that are not of binary values. To form a corresponding diffractive pattern for display using the DMD, which is a binary amplitude modulator with the binary states ON and OFF, the system performs additional processing. This processing can include quantization or binarization of the Complex IFFT Image 1403 to allow display on the binary DMD. Several methods create a binary diffractive image that produces a desired far field image, such as methods described by Stuart et. al., described hereinabove. Also, the system maps the quantized diffraction pattern data to match the data to the selected orientation type of DMD. If the DMD is a square pixel or "Manhattan" mirror orientation, the system performs one type of mapping. If the DMD is a diamond pixel orientation DMD, the system performs a different mapping to map that data onto the DMD. In example arrangements, the methods compute a diffraction pattern for display using the DMD that will produce the desired far field image.

Iterative optimization steps can better match the far field image to the desired image. In an example, the Gerchberg-Saxton algorithm is useful as an iterative algorithm. FIG. 14 illustrates the optimization process by the "Iterative Optimization" path 1407. This iterative process continues for each desired pattern to obtain a corresponding diffractive pattern for display using the DMD. In example arrangements, distortion or aberrations due to geometric distortion or optical distortion is compensated by modifying the diffraction pattern.

Because the diffraction pattern is a two-dimensional data array for display using the DMD, the diffraction patterns can be stored in memory as diffraction pattern templates. Additional patterns can be stored in memory in a system for retrieval and display. The processing to compute the diffraction patterns using the inverse Fourier transform can be performed "offline" or during a system calibration process, and example arrangements do not require a system to compute these diffraction patterns in real time or in the field. However, in an alternative example, real time processing can compute the diffractive patterns; this approach avoids storing all of the possible diffractive patterns needed in a memory. In an example arrangement, a two dimensional polynomial can be computed in a real time operation to perform the correction to the diffraction pattern to compensate for distortion, as further described hereinbelow.

Figure 15:
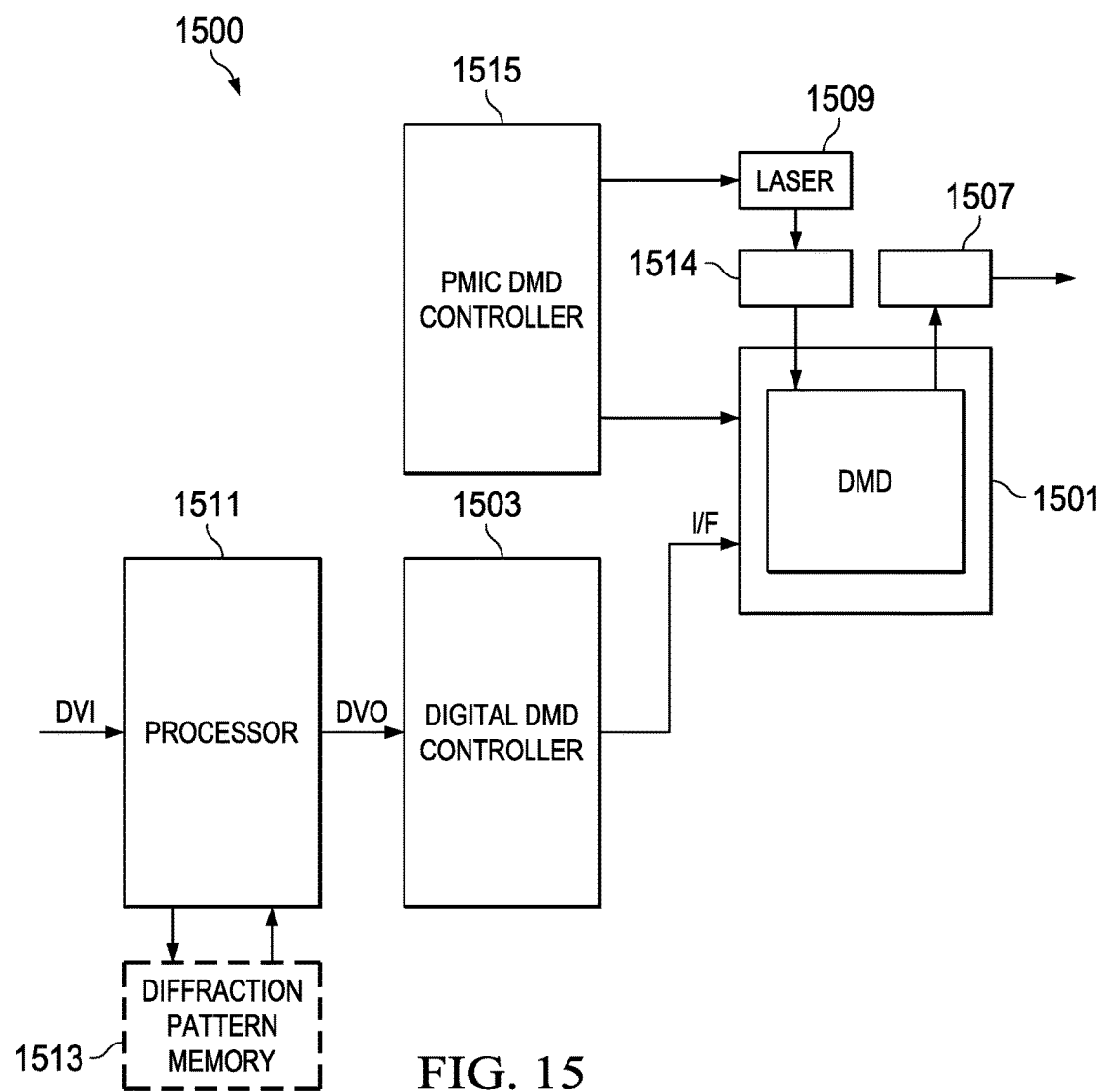
FIG. 15 is a block diagram of an arrangement for a lidar system.

FIG. 15 depicts in a simple circuit block diagram an arrangement 1500. A microprocessor, mixed signal processor, digital signal processor, microcontroller or other programmable processor device 1511 executes instructions that cause it to output digital video signals DVO for display by the DMD. A variety of sources may provide the digital video signals labeled DVI in FIG. 15. In example arrangements, a system can perform the inverse Fourier transforms described hereinabove to produce the DVI data needed for diffractive patterns in real time. In an alternative arrangement, the DVI data can come from stored diffraction pattern templates computed before operation of the system, or from diffraction patterns stored in a calibration operation during manufacture of the system. FIG. 15 shows an optional diffraction pattern memory 1513 for storing diffraction patterns coupled to processor 1511. Dynamic memory (DRAM), static random access memory (SRAM), non-volatile read write memory such as EEPROM, FLASH, EPROM and other data memory types can be used to store the diffraction patterns. The processor 1511 couples to a digital DMD controller circuit 1503. Digital DMD controller circuit 1503 is another digital video processing integrated circuit. In an example, digital DMD controller circuit 1503 is a customized integrated circuit or an application specific integrated circuit (ASIC). FIG. 15 also shows an analog circuit that manages power and LED illumination referred to as the "power management integrated circuit" (PMIC DMD Controller) 1515. PMIC 1515 controls the intensity and power to the coherent light source laser 1509. The Digital DMD Controller 1503 provides digital data to the DMD 1501 for modulating the illumination light that strikes the DMD surface. PMIC 1515 provides power and analog signals to the DMD 1501. The light rays from the illumination source 1509 travel to illumination components in block 1514. As described hereinabove, the illumination components in block 1514 include converging optics to focus rays onto the surface of the DMD 1501. The light strikes the reflective mirrors inside DMD 1501. The reflected light for projection leaves the surface of the DMD 1501 and travels into the negative optics 1507. In an arrangement described hereinabove, negative optics 1507 includes part of a reverse refractive telescope optical element that operates to transmit the diffracted light in an expanded scan angle. Together the integrated circuits 1511, 1503 and 1515 cause the DMD 1501 and the optical components 1514, 1507 to output the diffracted light.

Example integrated circuits that can implement the circuit shown in FIG. 15 include DMD controller ICs from Texas Instruments Incorporated. Example DMD controller ICs include the DLPC3430 DMD controller and the DLPC2601 ASIC device that can perform both digital and analog controller functions. Analog DMD controller devices from Texas Instruments Incorporated include the DLPA2000 device. Laser controller devices can power on and off the laser 1509 or form pulses.

The DMD of FIG. 15 can be a DMD device from Texas Instruments Incorporated such as the DLP2010DMD, which is a 0.2-inch diagonal device that provides wide VGA (WVGA) resolution. Example arrangements can include many other DMD devices that are available from Texas Instruments Incorporated.

Figure 16:
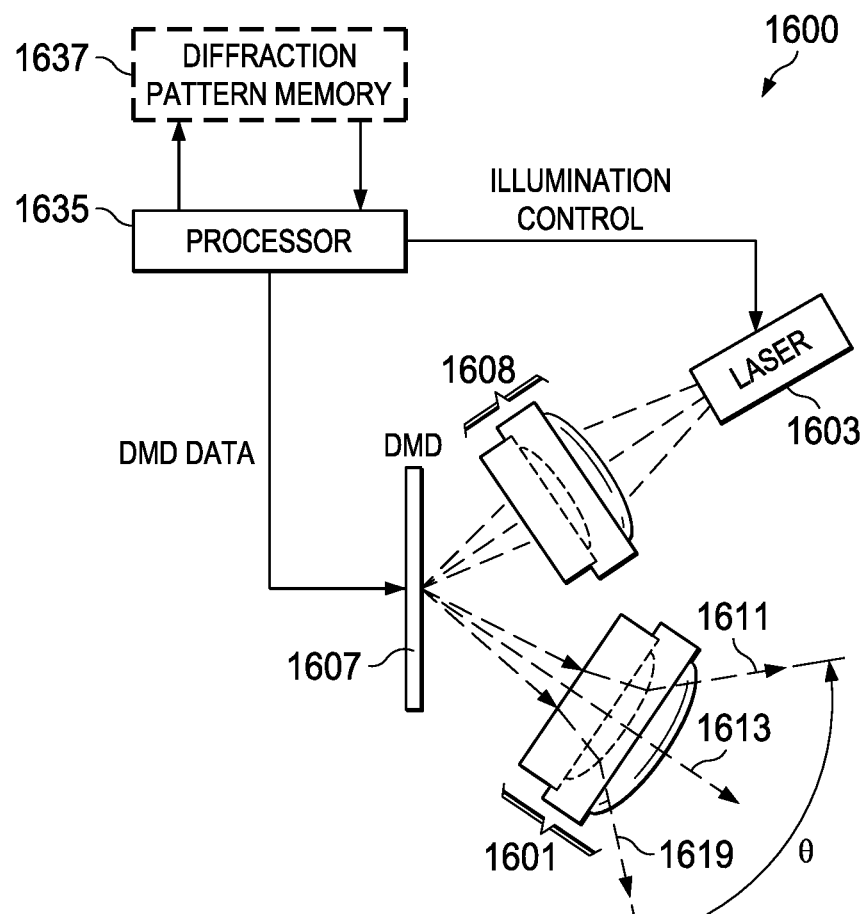
FIG. 16 illustrates another arrangement for a lidar system.

FIG. 16 depicts in a top view a block diagram for an example system 1600. In FIG. 16, a laser or other illumination source 1603 illuminates an array of micromirrors on DMD 1607. The angle of the beam from the laser to the DMD is determined by the tilt angles of the DMD chosen for the arrangement and by the desired path leaving the DMD surface. The DMD 1607 can be any DMD device. In more alternative arrangements, the DMD 1607 can be another reflective SLM, including a PSLM and a reflective LCoS device as described hereinabove.

In FIG. 16, a scan beam exits a negative optical element 1601 in three positions: 1611, 1613, and 1619. The beam positions 1611 and 1619 illustrate the scan angle θ obtained. In the example shown in FIG. 16, the negative optical element 1601 is a part of a reverse refractive telescope. A processor 1635 provides data "DMD Data" to the DMD 1607 and controls the laser 1603. The processor 1635 can include multiple custom or commercially available integrated circuits as described hereinabove to control the data displayed using the DMD and the laser pulses that illuminate the DMD. An optional storage for diffraction patterns couples to the processor 1635, the "Diffraction pattern memory" 1637, and stores two-dimensional arrays for displaying diffraction patterns using the DMD.

For example, as described hereinabove, the diffraction patterns are corrected from an initial value to compensate for distortion or aberrations in the scan beam caused by geometric distortion in the DMD device, or by other distortion caused by optical distortion.

Correction of a two dimensional diffraction pattern can be described by a wavefront correction factor φ. If the distortion is in one dimension, a correction factor φ can be one-dimensional. In a two-dimensional correction, the wavefront correction can be approximated using an n-th order polynomial expressions fitted to the optical path difference data or to a theoretical model for the system. The correction factor φ is computed in real time, or alternatively, the stored diffraction patterns is modified and the corrected diffraction patterns can be stored for lookup and display. In one arrangement, the correction is done in an off-line computation; while in an alternative arrangement the correction can be determined using modeling or simulation.

The two dimensional array of corrected values for positions x and y can be described by the following Equation (1):

$$H(x,y)=A\ \exp(j\varphi(x,y)) \tag{1}$$

where H(x, y) is the corrected diffraction pattern in two dimensions, and jφ(x, y) is a correction factor in two dimensions for each micromirror at a position x, y.

In an example arrangement, real time processing of the polynomial of Equation (1) computes the diffraction patterns with correction in real time. Alternatively, the algorithm is performed "off-line" with the results stored in a corrected diffraction pattern memory. For example, the computed corrected diffraction patterns can be stored as a two-dimensional lookup table that is addressed by the mirror index x,y for each position in the DMD array.

Figure 17:
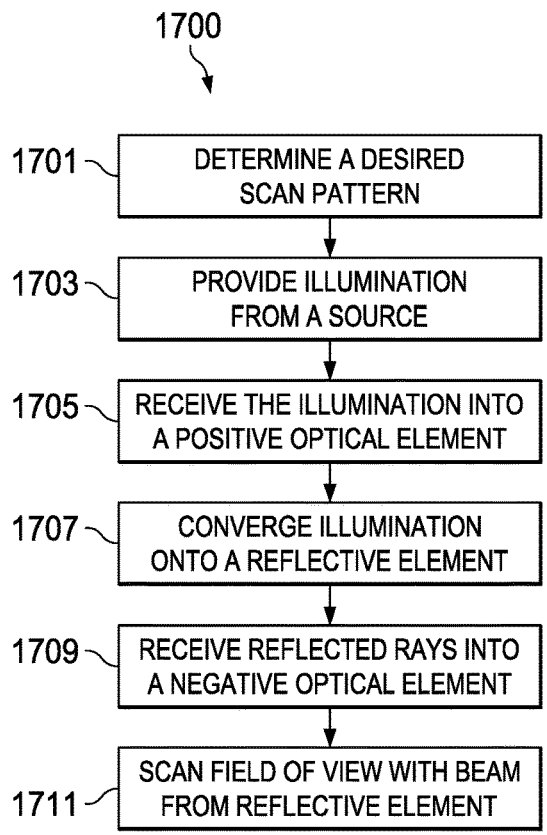
FIG. 17 is a flow diagram of an example method for use with example arrangements.

FIG. 17 depicts a flow diagram for an example method 1700. In FIG. 17, the method begins at step 1701, where a desired image pattern is determined. This image will appear in the field of view. At step 1703, the method provides illumination from a source. In step 1705, a positive optical element receives and converges the light rays. At step 1707, the converged light rays fall onto the surface of a reflective element. As described hereinabove, the reflective element can be an analog MEMS mirror, a DMD, a PSLM, or an LCoS device. At step 1709, the rays reflect into a negative optical element. As described hereinabove, in example arrangements the negative optical element is part of a reverse refractive telescope. In alternative arrangements, the negative optical element can be part of an afocal lens or lenses. At step 1711, the beam formed by an illumination source and the reflective element scans across a field of view.

Because the beam exits the system through the negative optical element, the scan angle for the beam is increased.

Figure 18:
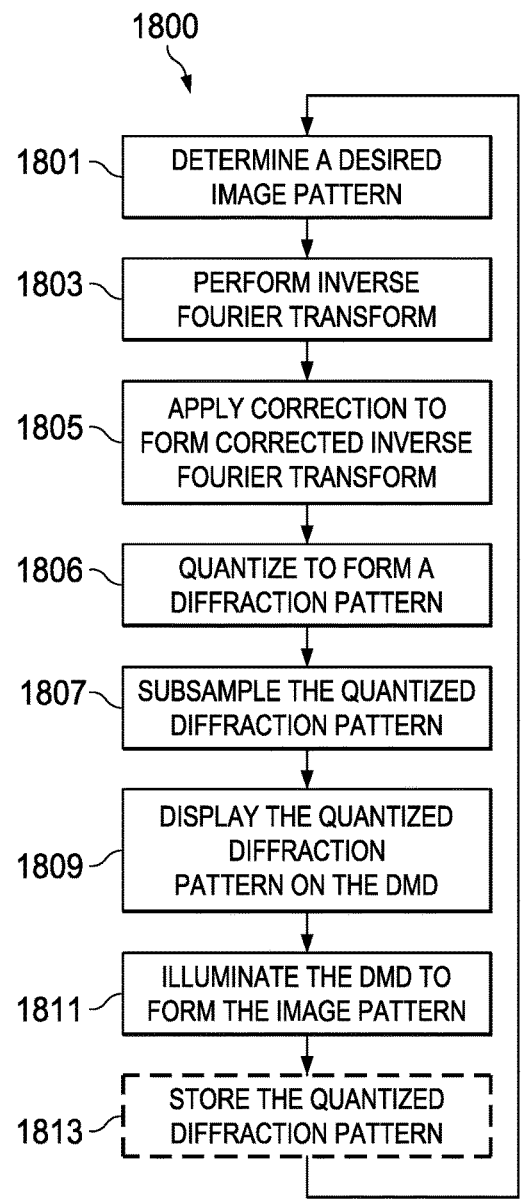
FIG. 18 is a flow diagram of a method of generating corrected diffraction patterns.

FIG. 18 illustrates another method arrangement 1800. At a step 1801, a desired image pattern is determined. At step 1803, the method performs an inverse Fourier transform. Fast Fourier transforms such as discrete fast Fourier transforms (DFFTs) can perform the inverse Fourier transform. For example, at step 1805, the method corrects the inverse Fourier transform, using a two dimensional polynomial such as Equation (1). At step 1806, the method performs a quantization or binarization step. Because the DMD is a binary amplitude modulator with two states, ON and OFF, the method quantizes the corrected inverse Fourier transform for use with the binary format of the DMD. In alternative example methods, the steps of FIG. 18 can be in another order. However, in the example of FIG. 18, the correction is applied before the quantization. As described hereinabove, the correction can compensate the beam patterns for geometric distortion inherent when using a DMD to reflect light, or for other distortion due to optical characteristics of the system. In step 1807, the method subsamples the quantized corrected diffraction pattern formed in step 1806 to match the particular DMD mirror orientation in the system. DMD devices differ according to orientation of their micromirrors, such as in either square or diamond orientation. For a diamond pixel DMD device, a different subsampling applies than that for a square pixel DMD device. At step 1809, the diffraction pattern displays on the DMD. At step 1811, the method illuminates the diffraction pattern on the DMD by the light source to form the image pattern. The image pattern forms as wavefronts of diffracted light that constructively and destructively interfere as the wavefronts move away from the DMD, and the desired pattern appears in the field of view. Step 1813 shows an optional storage step. Diffraction patterns can be stored in a pattern memory for later retrieval and display. Alternatively, the method can compute the DMD diffraction patterns as needed in real time, and the correction of step 1805 can be computed in real time, such as using Equation (1). Algorithms also exist that generate periodic diffraction patterns and that can be performed quickly without the use of Fourier transforms, and these algorithms can be used with example arrangements.

Figure 19:
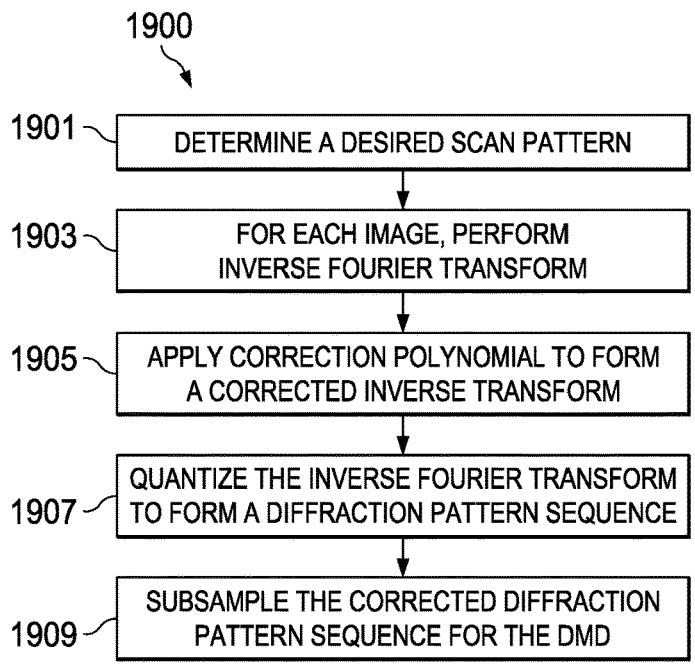
FIG. 19 is a flow diagram of a method of forming corrected diffraction pattern templates.

FIG. 19 illustrates in a flow diagram a method 1900 for forming diffraction pattern templates for use in example arrangements. In FIG. 19, the method begins at step 1901 where a desired scan pattern is determined. For example, the method can select a raster scan pattern. At step 1903, for each image in the pattern, the method performs an inverse Fourier transform. Because a scan pattern is a sequence of images, the method performs a plurality of inverse Fourier transforms. At step 1905, correction is applied. The correction can use a two-dimensional polynomial, such as in Equation (1). At step 1907, the method quantizes or performs binarization for each of the inverse Fourier transforms to form a diffraction pattern sequence for the binary DMD array. At step 1909, each of the corrected quantized diffraction patterns is subsampled to map it to the DMD device used in a particular arrangement. The subsampled and quantized corrected diffraction pattern sequence is then stored in memory for use.

The method of FIG. 19 illustrates that the diffraction patterns can be computed "off-line" or in a calibration operation during manufacture of an example system, and then the patterns can be stored for later use. In this approach, the system does not have to perform real time computations of the diffraction patterns during operation.

Figure 20:
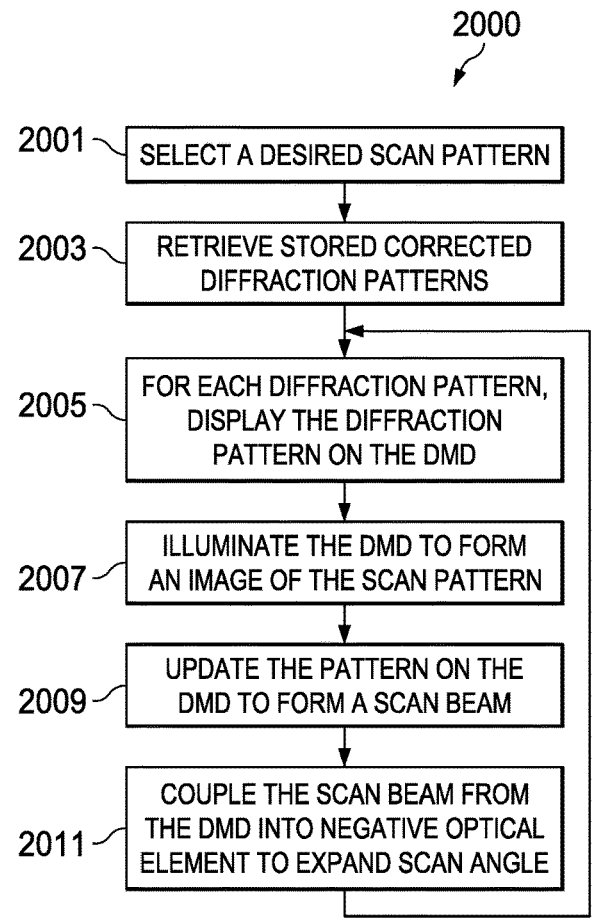
FIG. 20 is a flow diagram of a method of using stored corrected diffraction patterns to form a scan pattern.

FIG. 20 illustrates in a flow diagram a method 2000 for using the stored diffraction patterns to form a scan pattern. Beginning at step 2001, the method selects a desired scan pattern from a number of stored scan patterns. At step 2003, the method retrieves the stored corrected diffraction patterns corresponding to the desired scan pattern. At step 2005, a looping operation begins. For each diffraction pattern in a sequence needed to form the selected scan pattern in the field of view, the method displays the selected diffraction pattern using the DMD. At step 2007, the method illuminates the DMD to form an image that is part of the scan pattern. At step 2009, the method updates the pattern of the DMD to form a scan beam in the field of view. At step 2011, the scan beam reflects from the surface of the DMD into a negative optical element to expand the scan angle of the beam. The method continues looping through the sequence to continue scanning the field of view by returning to step 2005.

The example arrangements form beams for use in lidar systems useful in a wide variety of applications. Mobile navigation and collision avoidance systems, robotics, autonomous vehicle control, security, industrial automation, surveying, mapping, and meteorology are all applications for lidar systems including example arrangements. The systems use solid-state components without the need for mechanical parts. Because DMD devices can operate even with a large percentage of failed micromirrors, the systems using the DMD arrangements are inherently robust and reliable and are relatively low in cost. Similarly, the analog MEMS mirror, DMD PSLM and LCoS arrangements are also robust and reliable and relatively low in cost, with solid-state components. Use of a single illumination source and the lack of motors and rotors further reduces system cost, reduces system maintenance requirements, and increases reliability over conventional approaches. The ability to correct for distortion further enhances the system performance without additional cost or added components.

Modifications are possible in the described arrangements, and other arrangements that form additional aspects of this application are possible that are within the scope of the appended claims.

What is claimed is:

1. A method comprising:
   obtaining, by at least one processor, an image pattern sequence;
   computing, by the at least one processor, a sequence of diffractive images corresponding to the image pattern sequence;
   correcting, by the at least one processor, the sequence of diffractive images to compensate for distortion by a spatial light modulator, to produce a sequence of corrected diffractive images;
   mapping, by the at least one processor, the sequence of corrected diffractive images to produce a mapped sequence of diffraction patterns;
   setting, by the spatial light modulator, elements of the spatial light modulator to the mapped sequence of diffraction patterns; and
   for the mapped sequence of quantized diffraction patterns displayed using the spatial light modulator, illuminating, by a light source, the spatial light modulator to produce the image pattern sequence.

2. The method of claim 1, wherein computing the sequence of diffractive images corresponding to the image pattern sequence comprises applying an inverse Fourier transform to image patterns in the image pattern sequence.

3. The method of claim 1, further comprising:
storing the sequence of corrected diffractive images in a memory.

4. The method of claim 3, further comprising:
retrieving the sequence of corrected diffractive images from the memory; and
using the spatial light modulator, displaying the retrieved sequence of corrected diffractive images.

5. The method of claim 1, wherein correcting the sequence of diffractive images further comprises computing a two dimensional polynomial including a correction factor.

6. The method of claim 5, wherein computing the two dimensional polynomial includes computing:

$$H(x,y)=A\exp(j\varphi(x,y)),$$

where $H(x, y)$ is the corrected diffractive images in two dimensions, and
$j\varphi(x, y)$ is a correction factor in two dimensions for each element of the spatial light modulator at a position x, y.

7. The method of claim 1, wherein the spatial light modulator is a digital micromirror device, a phase light modulator, or a liquid crystal on silicon device.

8. The method of claim 1, further comprising quantizing the sequence of corrected diffractive images.

9. A method comprising:
determining, by at least one processor, an image pattern sequence;
computing, by the at least one processor, a sequence of diffractive images corresponding to the image pattern sequence;
correcting, by the at least one processor, the sequence of diffractive images to compensate for distortion by a spatial light modulator, to produce a sequence of corrected diffractive images;
mapping, by the at least one processor, the sequence of corrected diffractive images to produce a mapped sequence of diffraction patterns; and
storing, in memory, the mapped sequence of diffraction images.

10. The method of claim 9, wherein computing the sequence of diffractive images corresponding to the image pattern sequence comprises applying an inverse Fourier transform to image patterns in the image pattern sequence.

11. The method of claim 9, further comprising quantizing the sequence of corrected diffractive images.

12. The method of claim 9, wherein correcting the sequence of diffractive images further comprises computing a two dimensional polynomial including a correction factor.

13. The method of claim 12, wherein computing the two dimensional polynomial includes computing:

$$H(x,y)=A\exp(j\varphi(x,y)),$$

where $H(x, y)$ is the corrected diffractive images in two dimensions, and
$j\varphi(x, y)$ is a correction factor in two dimensions for each element of the spatial light modulator at a position x, y.

14. A system comprising:
a spatial light modulator;
a light source optically coupled to the spatial light modulator; and
at least one processor coupled to the spatial light modulator, the at least one processor configured to:
obtain an image pattern sequence;
compute a sequence of diffractive images corresponding to the image pattern sequence;
correct the sequence of diffractive images to compensate for distortion by a spatial light modulator, to produce a sequence of corrected diffractive images;
map the sequence of corrected diffractive images to produce a mapped sequence of diffraction patterns; and
instruct the spatial light modulator to display the mapped sequence of diffraction patterns;
wherein the spatial light modulator is configured to set elements based on the mapped sequence of diffraction patterns; and
wherein the light source is configured to illuminate the spatial light modulator to produce the image pattern sequence.

15. The system of claim 14, wherein computing the sequence of diffractive images corresponding to the image pattern sequence comprises applying an inverse Fourier transform to image patterns in the image pattern sequence.

16. The system of claim 14, wherein correcting the sequence of diffractive images further comprises computing a two dimensional polynomial including a correction factor.

17. The system of claim 16, wherein computing the two dimensional polynomial includes computing:

$$H(x,y)=A\exp(j\varphi(x,y)),$$

where $H(x, y)$ is the corrected diffractive images in two dimensions, and
$j\varphi(x, y)$ is a correction factor in two dimensions for each element of the spatial light modulator at a position x, y.

18. The system of claim 14, wherein the spatial light modulator is a digital micromirror device, a phase light modulator, or a liquid crystal on silicon device.

19. The system of claim 14, wherein the at least one processor is further configured to quantize the sequence of corrected diffractive images.

20. The system of claim 14, further comprising memory coupled to the at least one processor, wherein obtaining the image pattern sequence comprises retrieving the image pattern sequence from the memory.

* * * * *